United States Patent
Xu et al.

(10) Patent No.: US 11,729,783 B2
(45) Date of Patent: Aug. 15, 2023

(54) SOFT-COMBINING FOR CONTROL CHANNELS

(71) Applicant: Qualcomm Incorporated, San Diego, CA (US)

(72) Inventors: Changlong Xu, Beijing (CN); Liangming Wu, Beijing (CN); Kai Chen, Shenzhen (CN); Hao Xu, Beijing (CN); Jing Jiang, San Diego, CA (US); Jing Sun, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 16/772,736

(22) PCT Filed: Dec. 13, 2017

(86) PCT No.: PCT/CN2017/115921
§ 371 (c)(1),
(2) Date: Jun. 12, 2020

(87) PCT Pub. No.: WO2019/113833
PCT Pub. Date: Jun. 20, 2019

(65) Prior Publication Data
US 2021/0377917 A1 Dec. 2, 2021

(51) Int. Cl.
*H04L 1/00* (2006.01)
*H04L 5/00* (2006.01)
(Continued)

(52) U.S. Cl.
CPC .............. *H04W 72/23* (2023.01); *H04L 1/08* (2013.01); *H04L 5/0053* (2013.01)

(58) Field of Classification Search
CPC ... H04W 72/042; H04W 72/25; H04W 72/27; H04L 1/08; H04L 5/0053; H04L 1/1816; H04L 1/1819
See application file for complete search history.

(56) References Cited

U.S. PATENT DOCUMENTS

| 8,989,121 B2 | 3/2015 | Luo et al. |
| 9,295,056 B2 | 3/2016 | Chen et al. |

(Continued)

FOREIGN PATENT DOCUMENTS

| CN | 101584142 A | 11/2009 |
| CN | 101790885 A | 7/2010 |

(Continued)

OTHER PUBLICATIONS

Huawei et al., "Timing Relationship between PDCCH and POSCH for Coverage Improvement", 3GPP Draft, 3GPP TSG RAN WG1 Meeting #75, R1-135022, 3rd Generation Partnership Project (3GPP), Mobile Competence Centre, 650, Route Des Lucioles, F-86921 Sophia-Antipolis Cedex, France, vol. RAN WG1, No. San Francisco, USA, Nov. 11, 2013-Nov. 15, 2013, Nov. 13, 2013 (Nov. 13, 2013), XP050734725, 4 Pages, Retrieved from the Internet: URL:http://www.3gpp.org/ftp/Meetings 3GPP SYNC/RAN/RAN1/Docs/ [retrieved on Nov. 13, 2013].

(Continued)

*Primary Examiner* — Diane L Lo
*Assistant Examiner* — Abusayeed M Haque
(74) *Attorney, Agent, or Firm* — Holland & Hart LLP

(57) ABSTRACT

Methods, systems, and devices for wireless communications are described. A wireless device such as a user equipment (UE) may monitor a search space of a control channel for at least one downlink transmission. The UE may perform a plurality of decoding operations on a plurality of decoding candidates associated with the downlink control information (Continued)

format transmitted in a plurality of transmission time intervals (TTIs). In some cases, the plurality of decoding operations may comprise performing a first decoding on a first decoding candidate received in a current TTI, the first decoding operation applying a first descrambling code to the first decoding candidate, and performing a second decoding operation on a combined decoding candidate that comprises soft combined information from the first and second decoding candidate, the second decoding candidate received in a prior TTI.

68 Claims, 15 Drawing Sheets

(51) Int. Cl.
*H04W 72/23* (2023.01)
*H04L 1/08* (2006.01)

(56) References Cited

U.S. PATENT DOCUMENTS

| | | | | |
|---|---|---|---|---|
| 2011/0085493 | A1* | 4/2011 | Chang | H04L 1/0038 370/328 |
| 2015/0181576 | A1 | 6/2015 | Papasakellariou et al. | |
| 2015/0189574 | A1 | 7/2015 | Ng et al. | |
| 2016/0345311 | A1* | 11/2016 | Chen | H04L 5/00 |
| 2017/0019915 | A1* | 1/2017 | Nogami | H04L 5/0053 |
| 2017/0134137 | A1 | 5/2017 | Kuchibhotla et al. | |
| 2017/0149543 | A1 | 5/2017 | Ang et al. | |
| 2017/0359849 | A1* | 12/2017 | Zhang | H04W 74/04 |
| 2018/0092089 | A1* | 3/2018 | Yin | H04L 5/0055 |
| 2018/0287742 | A1* | 10/2018 | Feng | H04W 72/0446 |

FOREIGN PATENT DOCUMENTS

| | | | | |
|---|---|---|---|---|
| CN | 104160772 | A | 11/2014 | |
| CN | 104509190 | A | 4/2015 | |
| CN | 105706512 | A | 6/2016 | |
| CN | 110192362 | * | 1/2017 | ............ H04W 72/00 |
| CN | 107197492 | A | 9/2017 | |
| EP | 3098998 | A1 | 11/2016 | |
| EP | 3280086 | A1 * | 2/2018 | ............... H04L 1/18 |
| KR | 20080109578 | * | 5/2014 | ............... H04B 7/26 |
| KR | 3280086 | * | 4/2016 | ............... H04I 1/18 |
| KR | WO 2017074156 | * | 5/2017 | ............ H04W 72/04 |
| WO | WO-2008136574 | A1 | 11/2008 | |
| WO | WO-2013048841 | A1 | 4/2013 | |
| WO | WO-2013066935 | A1 | 5/2013 | |
| WO | WO-2013142410 | | 9/2013 | |
| WO | WO-2014069946 | A1 | 5/2014 | |
| WO | WO-2017014549 | A1 | 1/2017 | |
| WO | WO-2017074156 | A1 * | 5/2017 | ............ H04L 5/001 |
| WO | WO2017136592 | * | 8/2017 | ................ H04I 5/00 |
| WO | WO-2017136592 | A1 * | 8/2017 | .......... H04W 72/042 |
| WO | WO-2017147550 | A1 | 8/2017 | |

OTHER PUBLICATIONS

Supplementary European Search Report—EP17934942—Search Authority—Munich—dated Jun. 21, 2021.
International Search Report and Written Opinion—PCT/CN2017/115921—ISA/EPO—dated Sep. 5, 2018.
WI Rapporteur (Ericsson): "RAN1 Agreements for Rel-13 NB-IoT" [online], 3GPP TSG-RAN WG1 NB-IoT Ad-Hoc Meeting R1-162038, Mar. 24, 2016, 19 Pages, URL:http://www.3gpp.org/ftp/tsg_ran/WG1_RL1/TSGR1_AH/LTE_NB-IoT_1603/Docs/R1-162038.zip.

* cited by examiner

SOFT-COMBINING FOR CONTROL CHANNELS

CROSS REFERENCE

The present application is a 371 national phase of International Patent Application No. PCT/CN2017/115921 by Xu et al., entitled "SOFT-COMBINING FOR CONTROL CHANNELS," filed Dec. 13, 2017, assigned to the assignee hereof.

BACKGROUND

The following relates generally to wireless communication, and more specifically to soft-combining of a Physical Downlink Control Channel (PDCCH) for Ultra Reliable Low Latency Communications (URLLC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communication systems (e.g., URLLC), latency and/or reliability requirements (e.g., block error rate (BLER) and/or latency) for control and data channel transmissions may be more stringent as compared to other wireless communication systems (e.g., LTE). Current techniques for transmitting control and/or data channels may not meet the requirements. For instance, performance and/or latency of a downlink control channel, such as Physical Downlink Control Channel (PDCCH) for enhanced mobile broadband (eMBB) in NR may be similar to those achieved in LTE, which may not be adequate for URLLC in NR, leading to performance issues at a UE. Thus, one or more enhancements for control channel transmissions in low latency systems may be desired.

SUMMARY

The described techniques relate to improved methods, systems, devices, or apparatuses that support soft-combining of Physical Downlink Control Channel (PDCCH) for Ultra Reliable Low Latency Communication (URLLC). A wireless device such as a base station may transmit repeated versions of a PDCCH in a plurality of TTIs. In some cases, each repetition may be scrambled using a different scrambling code prior to transmission. In some cases, a UE may monitor a search space of a control channel for a downlink control transmission. Further, the UE may perform one or more decoding operations by soft-combining information from one or more decoding candidates of one or more repeated PDCCH transmissions. In some cases, soft-combining the repeated PDCCH transmissions may serve to enhance the performance and/or latency of PDCCH in low latency communication systems.

A method of wireless communication is described. The method may include monitoring a search space of a control channel for a downlink control information format, performing a plurality of decoding operations on a plurality of decoding candidates associated with the downlink control information format transmitted in a plurality of TTIs, wherein the plurality of decoding operations comprises at least: performing a first decoding operation on a first decoding candidate received in a first TTI, the first decoding operation applying a first descrambling code to the first decoding candidate, performing a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate, and obtaining downlink control information based at least in part on a result of the plurality of decoding operations.

An apparatus for wireless communication is described. The apparatus may include means for monitoring a search space of a control channel for a downlink control information format, means for performing a plurality of decoding operations on a plurality of decoding candidates associated with the downlink control information format transmitted in a plurality of TTIs, wherein the plurality of decoding operations comprises at least: performing a first decoding operation on a first decoding candidate received in a first TTI, the first decoding operation applying a first descrambling code to the first decoding candidate, means for performing a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate, and means for obtaining downlink control information based at least in part on a result of the plurality of decoding operations.

Another apparatus for wireless communication is described. The apparatus may include a processor, memory in electronic communication with the processor, and instructions stored in the memory. The instructions may be operable to cause the processor to monitor a search space of a control channel for a downlink control information format, perform a plurality of decoding operations on a plurality of decoding candidates associated with the downlink control information format transmitted in a plurality of TTIs, wherein the plurality of decoding operations comprises at least: performing a first decoding operation on a first decoding candidate received in a first TTI, the first decoding operation applying a first descrambling code to the first decoding candidate, perform a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate, and obtain downlink control information based at least in part on a result of the plurality of decoding operations.

A non-transitory computer-readable medium for wireless communication is described. The non-transitory computer-readable medium may include instructions operable to cause a processor to monitor a search space of a control channel for a downlink control information format, perform a plurality of decoding operations on a plurality of decoding candidates associated with the downlink control information format transmitted in a plurality of TTIs, wherein the plurality of decoding operations comprises at least: performing a first decoding operation on a first decoding candidate received in a first TTI, the first decoding operation applying a first descrambling code to the first decoding candidate, perform a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate, and obtain downlink control information based at least in part on a result of the plurality of decoding operations.

In some examples of the method, apparatus, and non-transitory computer-readable medium described above, the downlink control information format may be associated with a resource grant and comprises a single modulation and coding scheme field and a single resource block allocation field.

In some examples of the method, apparatus, and non-transitory computer-readable medium described above, the downlink control information format comprises a plurality of downlink grants transmitted over the plurality of TTIs, and wherein each of the plurality of TTIs comprises a downlink shared channel transmission corresponding to a respective one of the plurality of downlink grants.

In some examples of the method, apparatus, and non-transitory computer-readable medium described above, the downlink control information format comprises respective resource block allocation fields corresponding to each of the downlink shared channel transmissions.

In some examples of the method, apparatus, and non-transitory computer-readable medium described above, the downlink control information format comprises respective modulation and coding scheme fields corresponding to each of the downlink shared channel transmissions.

Some examples of the method, apparatus, and non-transitory computer-readable medium described above may further include processes, features, means, or instructions for decoding the downlink shared channel transmission by combining information for the downlink shared channel transmission received in the plurality of TTIs.

In some examples of the method, apparatus, and non-transitory computer-readable medium described above, the downlink control information format comprises a plurality of uplink grants transmitted over the plurality of TTIs.

Some examples of the method, apparatus, and non-transitory computer-readable medium described above may further include processes, features, means, or instructions for selecting a resource block allocation for an uplink shared channel transmission based on a decoding index of the plurality of uplink grants.

Some examples of the method, apparatus, and non-transitory computer-readable medium described above may further include processes, features, means, or instructions for selecting a modulation and coding scheme for an uplink shared channel transmission based on a decoding index of the plurality of uplink grants.

A method of wireless communication is described. The method may include identifying a search space of a control channel for a UE served by a base station for a downlink control information format, transmitting a first repetition version of the downlink control information format in a first TTI, the first repetition version scrambled according to a first scrambling code, and transmitting, based on determining that decoding of the first repetition version was unsuccessful at the UE, a second repetition version of the downlink control information format in a second TTI, the second repetition version scrambled according to a second scrambling code.

An apparatus for wireless communication is described. The apparatus may include means for identifying a search space of a control channel for a UE served by a base station for a downlink control information format, means for transmitting a first repetition version of the downlink control information format in a first TTI, the first repetition version scrambled according to a first scrambling code, and means for transmitting, based on determining that decoding of the first repetition version was unsuccessful at the UE, a second repetition version of the downlink control information format in a second TTI, the second repetition version scrambled according to a second scrambling code.

Another apparatus for wireless communication is described. The apparatus may include a processor, memory in electronic communication with the processor, and instructions stored in the memory. The instructions may be operable to cause the processor to identify a search space of a control channel for a UE served by a base station for a downlink control information format, transmit a first repetition version of the downlink control information format in a first TTI, the first repetition version scrambled according to a first scrambling code, and transmit, based on determining that decoding of the first repetition version was unsuccessful at the UE, a second repetition version of the downlink control information format in a second TTI, the second repetition version scrambled according to a second scrambling code.

A non-transitory computer-readable medium for wireless communication is described. The non-transitory computer-readable medium may include instructions operable to cause a processor to identify a search space of a control channel for a UE served by a base station for a downlink control information format, transmit a first repetition version of the downlink control information format in a first TTI, the first repetition version scrambled according to a first scrambling code, and transmit, based on determining that decoding of the first repetition version was unsuccessful at the UE, a second repetition version of the downlink control information format in a second TTI, the second repetition version scrambled according to a second scrambling code.

In some examples of the method, apparatus, and non-transitory computer-readable medium described above, the downlink control information format may be associated with a resource grant and comprises a single modulation and coding scheme field and a single resource block allocation field.

Some examples of the method, apparatus, and non-transitory computer-readable medium described above may further include processes, features, means, or instructions for transmitting a first repetition of a downlink shared channel transmission in the first TTI. Some examples of the method, apparatus, and non-transitory computer-readable medium described above may further include processes, features, means, or instructions for transmitting a second repetition of the downlink shared channel transmission in the second TTI.

In some examples of the method, apparatus, and non-transitory computer-readable medium described above, the downlink control information format comprises respective resource block allocation fields corresponding to each of a plurality of repetition versions of the downlink shared channel transmission.

In some examples of the method, apparatus, and non-transitory computer-readable medium described above, the downlink control information format comprises respective modulation and coding scheme fields corresponding to each of a plurality of repetition versions of the downlink shared channel transmission.

In some examples of the method, apparatus, and non-transitory computer-readable medium described above, the downlink control information format comprises an uplink grant.

Some examples of the method, apparatus, and non-transitory computer-readable medium described above may further include processes, features, means, or instructions for monitoring, for each of the first and second repetition versions of the downlink control information format, respective resource block allocations identified by a repetition version index to the plurality of resource block allocation fields. Some examples of the method, apparatus, and non-transitory computer-readable medium described above may further include processes, features, means, or instructions for receiving an uplink shared channel transmission on at least one of the respective resource block allocations.

In some examples of the method, apparatus, and non-transitory computer-readable medium described above, the downlink control information format comprises a plurality of modulation and coding scheme fields, and wherein the monitoring comprises: monitoring the respective resource block allocations according to respective modulation and coding schemes identified by the repetition version index to the plurality of modulation and coding scheme fields.

DETAILED DESCRIPTION

Figure 1:
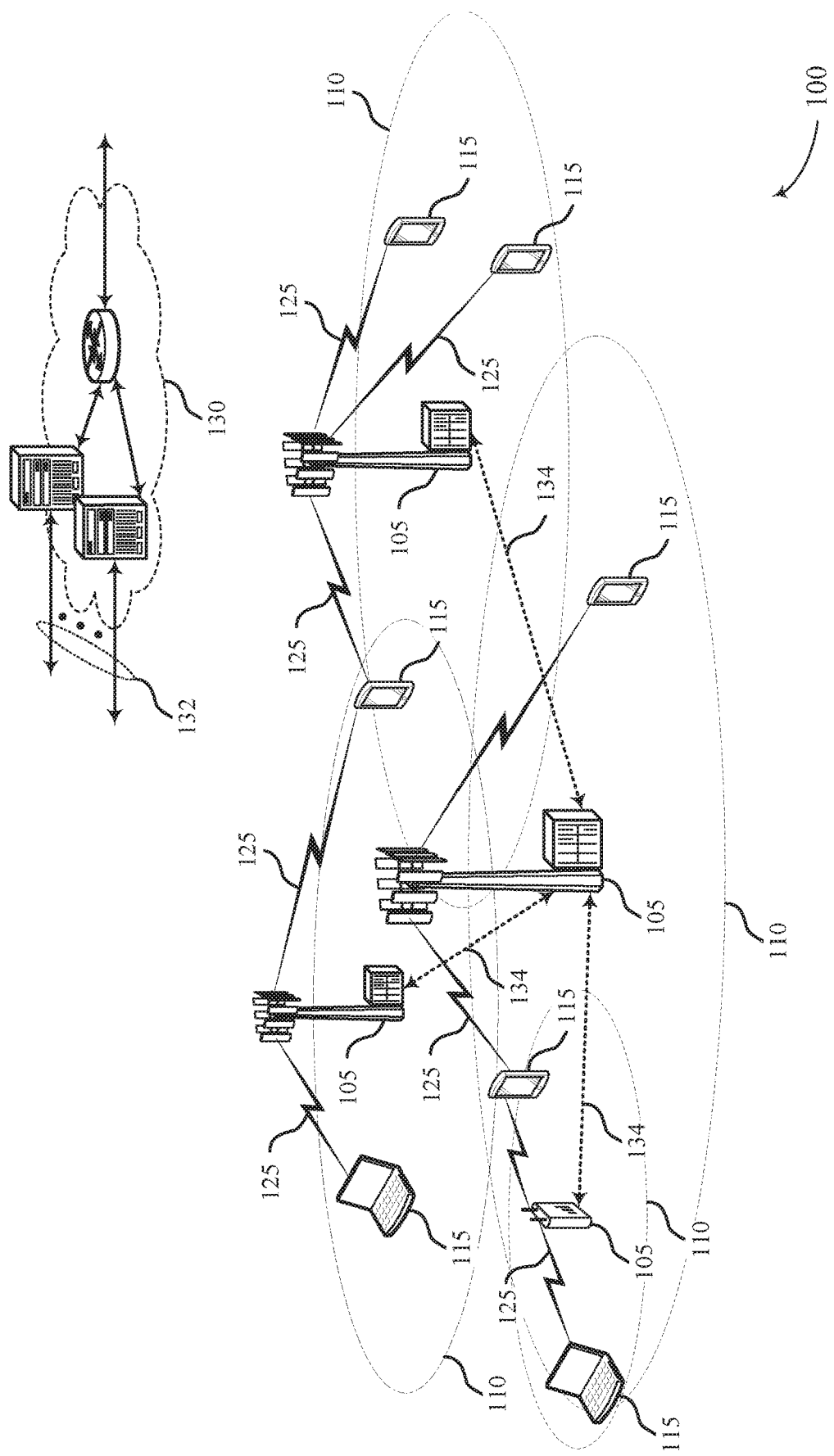
FIG. 1 illustrates an example of a system for wireless communication that supports soft-combining of PDCCH for URLLC in accordance with aspects of the present disclosure.

In some wireless communication systems supporting low latency communications (e.g., Ultra Reliable Low Latency Communications (URLLC)), a base station may transmit control information to a user equipment (UE) in a downlink channel (e.g., PDCCH) in a particular transmission time interval (TTI), which may be, for example, a shortened TTI (sTTI). In some cases, the latency and/or performance requirements of control channel transmissions in low latency systems may be more stringent as compared to other wireless communication systems. In such cases, current techniques of transmitting a control channel may need to be enhanced, in order to support the low latency and/or performance requirements of URLLC. However, increasing the effective coding rate of a given PDCCH (e.g., increasing the number of resource elements for each PDCCH transmission within the control channel) may lead to inefficient use of control channel resources.

According to described techniques, a base station may transmit repeated versions of a control channel (e.g., PDCCH) over multiple TTIs. The repetitions may be contingent on the absence of an indicator that the control channel was successfully decoded by the UE (e.g., receipt of an acknowledgement for a downlink transmission or an uplink transmission from the UE). Further, each repeated version may be scrambled using a different scrambling code, which allows soft-combining across multiple TTIs with overlapping hypotheses. In blind decoding of the control channel, a UE may attempt to decode the PDCCH received in a given TTI and one or more inter-TTI hypotheses soft-combining PDCCH from previous TTIs by applying one or more descrambling codes to each decoding candidate of the multiple downlink control transmissions until the blind decoding detects a PDCCH that passes error checking (e.g., cyclic redundancy check (CRC)). For example, the UE may perform a first decoding operation on a first decoding candidate received in a current TTI, the first decoding operation applying a first descrambling code to the first decoding candidate, and if the first decoding candidate does not pass error checking, perform a second decoding operation on a combined decoding candidate that comprises soft-combined information from the first decoding candidate and a second decoding candidate received in a prior TTI. The second decoding operation may apply a second descrambling code to the first decoding candidate and the first descrambling code to the second decoding candidate. In some cases, this process may be expanded for more than two decoding candidates (e.g., four (4)).

In some cases, the frame or TTI index in which a control channel (e.g., PDCCH) is transmitted may be known to a UE, for example, via Radio Resource Control (RRC) configuration, or via any other physical channel. Furthermore, the location in time and/or frequency domain, aggregation level, and content of PDCCH may be fixed in each transmission (e.g., via a control channel resource set (CORESET)). In some cases, the base station may utilize 'N' contingent versions (e.g., 4) scrambled using different scrambling codes (e.g., ++, +−, −+, and −−). Thus, the process described above may allow the UE to store search spaces of at most 'N−1' transmissions, where 'N' denotes the number of possible repetition versions of the PDCCH with different scrambling codes.

In some cases, the UE may utilize a blind detection process for obtaining control information, by monitoring a search space of a PDCCH for at least one downlink control transmission. For example, the UE may find its PDCCH by monitoring a set of PDCCH candidates (i.e., a set of Control Channel Elements (CCEs) on which PDCCH could be mapped) in each TTI. In some cases, a CCE may refer to the smallest resource allocation for transmitting PDCCH content, and may include multiple resource elements or resource element groups (REGs). The UE may then demask each control candidate's cyclic redundancy check (CRC) using a unique identifier (e.g., Radio Network Temporary Identifier (RNTI)). Further, if the UE does not detect a CRC error, the UE may establish that it is the intended recipient of the control information. In some cases, the number of blind detections performed by the UE may be reduced by limiting the location and aggregation levels (i.e., number of CCEs for PDCCH transmission) supported in URLLC. In some cases, the UE may need to store at most 'N' PDCCH transmissions after the most recent Acknowledgment (ACK) feedback transmitted by the UE to the base station.

In some cases, the UE may utilize the downlink control information in order to gain further information pertaining to downlink and/or uplink data transmissions. For instance, the downlink control information may indicate the resource allocation, modulation and coding scheme (MCS), or a combination, for a Physical Uplink Shared Channel (PUSCH) or a Physical Downlink Shared Channel (PDSCH). In some cases, the at least one downlink control transmission may be associated with an uplink or downlink resource grant. In a first option, the base station may indicate the same MCS and Resource Block Allocation (RBA) to be applied to each downlink or uplink data transmissions, over a plurality of TTIs. In a second option, the base station may indicate the same MCS, and a variable RBA to be applied to downlink or uplink data transmissions over a plurality of TTIs. In a third option, the base station may indicate both variable MCS and RBA to be applied to downlink or uplink data transmissions in a plurality of TTIs.

Thus, for the second and third options, the resource block allocation, MCS, or both, selected by the UE for transmission of PUSCH may be based in part on a decoding index of one or more uplink grants. For instance, if the UE decodes a PDCCH scrambled using a particular scrambling code (e.g., −+), then the UE may select the MCS and RBA indicated by that version of the PDCCH for reception of PDSCH, or transmission of PUSCH.

Aspects of the disclosure are initially described in the context of a wireless communications system. Aspects of the disclosure are further illustrated by and described with respect to frame structures for uplink and downlink transmissions, as well as apparatus diagrams, system diagrams, and flowcharts that relate to soft-combining of PDCCH for URLLC.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, base station 105 may transmit repeated versions of a PDCCH in a plurality of TTIs. In some cases, each repetition may be scrambled using a different scrambling code prior to transmission. In some aspects, UE 115 may monitor a search space of a control channel for a downlink control transmission. Further, the UE 115 may perform one or more decoding operations by soft-combining information from one or more decoding candidates of one or more repeated PDCCH transmissions. In some cases, soft-combining the repeated PDCCH transmissions may serve to enhance the performance and/or latency of PDCCH in wireless communication system 100.

Figure 2:
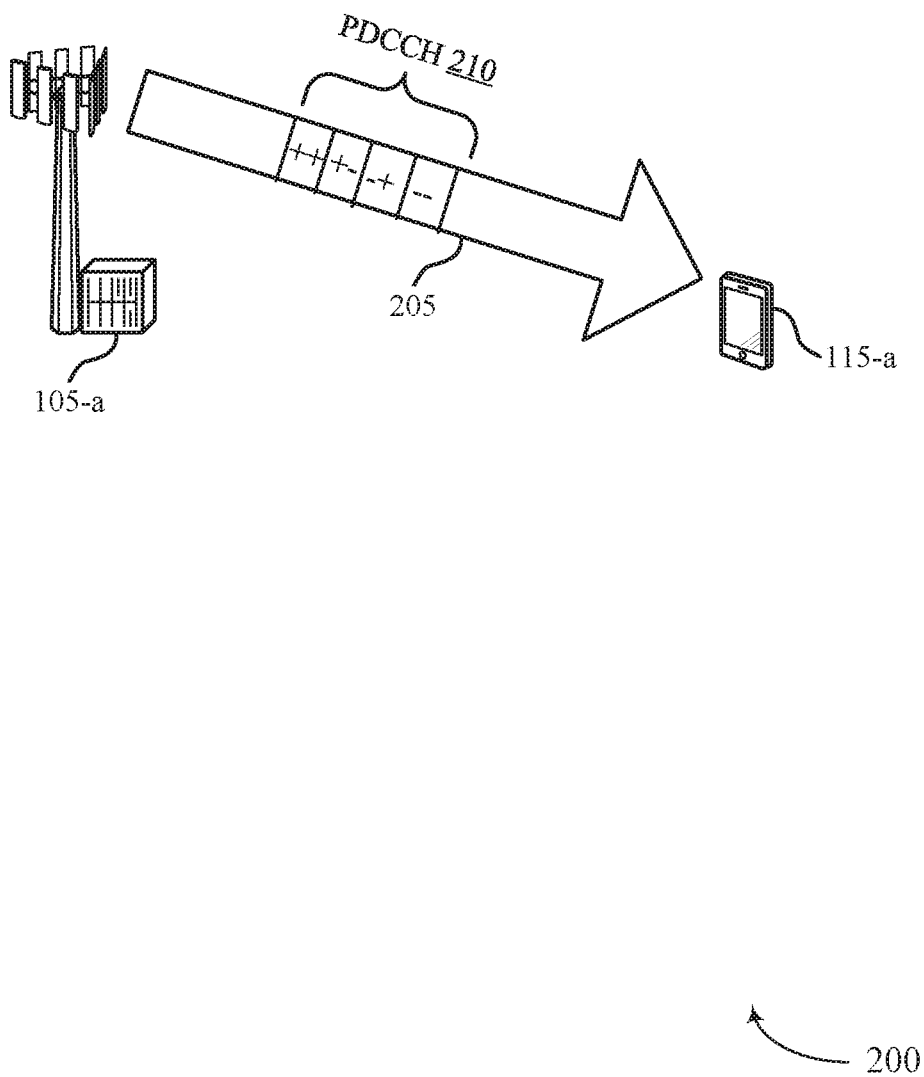
FIG. 2 illustrates an example of a wireless communication system that supports soft-combining of PDCCH for URLLC in accordance with aspects of the present disclosure.

FIG. 2 illustrates an example of a wireless communication system 200 that supports soft-combining of PDCCH for URLLC in accordance with various aspects of the present disclosure. In some examples, wireless communication system 200 may implement aspects of wireless communication system 100. Wireless communications system 200 may include base station 105-a and UE 115-a, which may be examples of the corresponding devices described with reference to FIG. 1. Base station 105-a and UE 115-a may be in communication with each other over communication link 205. In some cases, wireless communication system 200 may operate in mmW spectrum, or may support enhanced broadband communications, ultra-reliable (e.g., mission critical) communications, low latency communications, or communications with low-cost and low-complexity devices.

In wireless communications system 200, base station 105-a may transmit repeated versions of a downlink control transmission (e.g., PDCCH 210) over multiple TTIs. The downlink control transmission may include one of multiple downlink control information formats, which may be associated with various types of control transmissions (e.g., downlink grants, uplink grants, transmit power control, other information). The repetitions may be contingent on the absence of an indicator that the control channel was successfully decoded by the UE (e.g., receipt of an acknowledgement for a downlink transmission or an uplink transmission from the UE). Further, each repeated version may be scrambled using a different scrambling code, as further illustrated by (++), (+−), (−+), and (−−), which allows soft-combining across multiple TTIs with overlapping hypotheses. In blind decoding of PDCCH 210, UE 115-a may attempt to decode the PDCCH received in a given TTI and one or more inter-TTI hypotheses by soft-combining PDCCH from previous TTIs by applying one or more descrambling codes to each decoding candidate of the multiple downlink control transmissions until the blind decoding detects a PDCCH that passes error checking (e.g., CRC). For example, the UE 115-a may perform a first decoding operation on a first decoding candidate (e.g., PDCCH scrambled with +−) received in a current TTI, the first decoding operation applying a first descrambling code (e.g., ++) to the first decoding candidate, and perform a second decoding operation on a combined decoding candidate (i.e., if the first decoding candidate does not pass error checking) that comprises soft-combined information from the first decoding candidate and a second decoding candidate (e.g., PDCCH scrambled with ++) received in a prior TTI. In some cases, the second decoding operation may apply a second descrambling code (e.g., +−) to the first decoding candidate and the first descrambling code (e.g., ++) to the second decoding candidate. In some cases, this process may be expanded for more than two decoding candidates (e.g., PDCCH scrambled with −+, −−, or both). In some cases, the process described above may allow the UE 115-a to store search spaces of at most 'N−1' transmissions, where 'N' denotes the number of repetition versions of the PDCCH with different scrambling codes.

Figure 3:
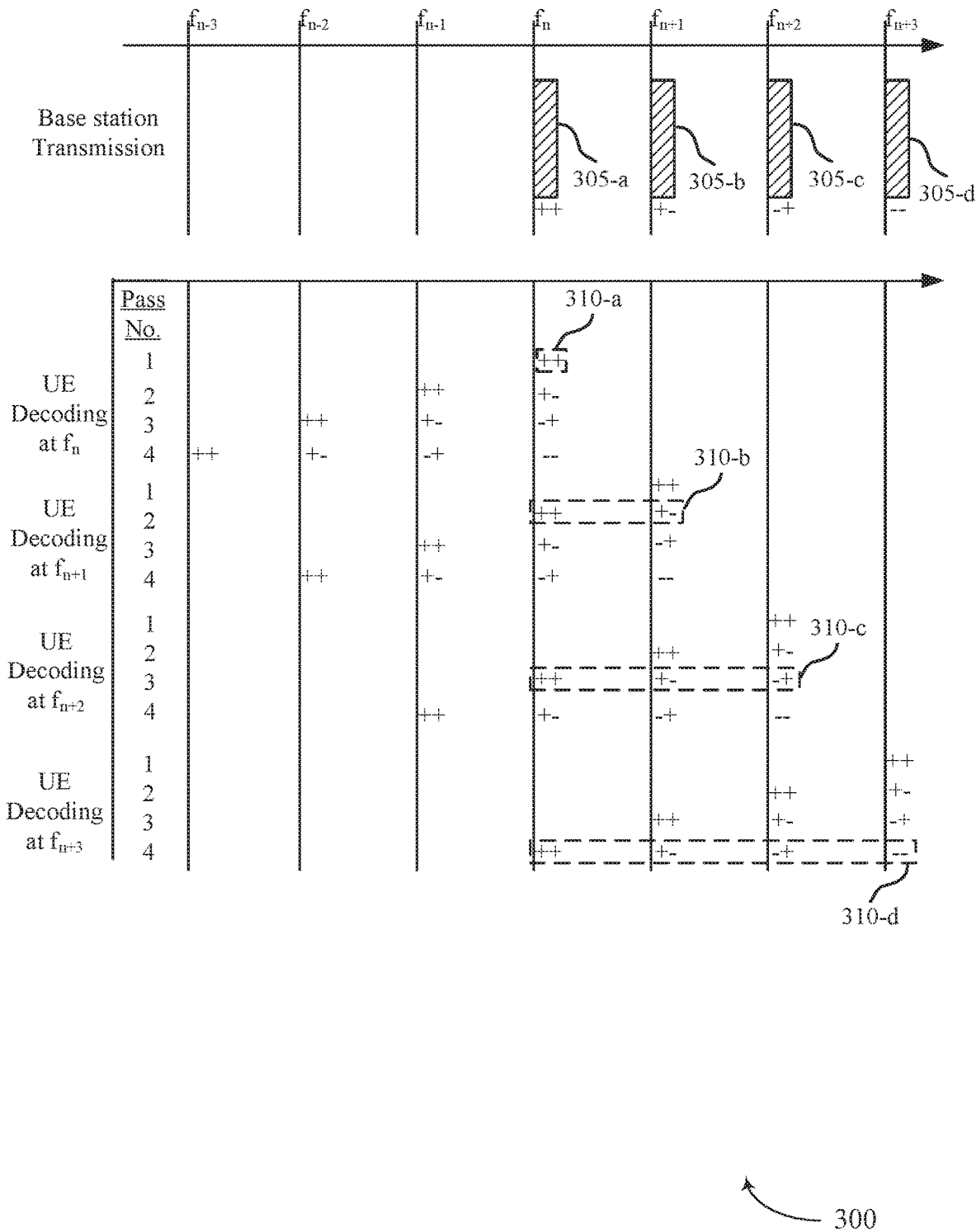
FIG. 3 illustrates an example of a frame structure that supports soft-combining of PDCCH for URLLC in accordance with aspects of the present disclosure.

FIG. 3 illustrates an example of a communication process 300 that supports soft-combining of PDCCH for URLLC in accordance with various aspects of the present disclosure. In some examples, communication process 300 may be implemented by aspects of wireless communication system 100 and/or 200. FIG. 3 illustrates the decoding of contingent PDCCH repetitions as discussed in FIG. 2. In FIG. 3, TTIs are referred to as frames for ease of description. However, it should be understood that the discussed techniques apply to frames, subframes, sTTIs, or any other type of TTI that generally includes one instance of a control channel per TTI.

At frame index $f_n$, a base station 105 may transmit downlink control information (DCI) over a first version of a PDCCH (e.g., PDCCH 305-a), the PDCCH scrambled using scrambling code ++. In some cases, a UE 115 monitoring a search space of a control channel for downlink control transmissions, may receive PDCCH 305-a, and attempt one or more decoding operations. For instance, UE 115 may perform a first decoding operation on a first decoding candidate (e.g., PDCCH 305-a) by applying a first descrambling code (e.g., ++) to the decoding candidate as shown by decoding pass 310-a. In some cases, the UE 115 may determine that the decoding is successful (e.g., CRC pass) for decoding pass 310-a at frame index $f_n$. Upon successful decoding of the PDCCH for a decoding candidate, the UE may parse the DCI included in the PDCCH and perform one or more further operations. For example the DCI may be associated with a downlink grant and the UE may decode the corresponding PDSCH. If decoding of the PDSCH is successful, the UE may transmit an Acknowledgement (ACK). Alternatively, the DCI may be associated with an uplink grant, and the UE may transmit a PUSCH on the granted uplink resources.

In some cases, however, the UE may fail to decode PDCCH 305-a at decoding pass 310-a because the channel conditions are too low for decoding using a single PDCCH instance. The UE may perform additional passes as shown at frame index $f_n$ which each may also fail decoding. At frame $f_{n+1}$, the base station may transmit the DCI in a second repetition of PDCCH (e.g., PDCCH 305-b), scrambled using scrambling code +−. Again, at frame $f_{n+1}$ the UE may perform multiple decoding passes on each blind decoding candidate. For example, the UE may start by decoding PDCCH 305-b using the first descrambling code (e.g., ++). Because the base station used scrambling code +− to scramble PDCCH 305-b, this decoding pass fails. In a second decoding pass 310-b for frame $f_{n+1}$, the UE may soft combine the current PDCCH 305-b using descrambling code +−, with the previous PDCCH 305-a using descrambling code ++. If decoding pass 310-b passes, the UE may perform further operations according to the decoded DCI as described above. If decoding pass 310-b fails (e.g., because the soft-combined symbols from PDCCH 305-a and 305-b still do not overcome the channel conditions), the UE may perform additional decoding passes at frame $f_{n+1}$, which may also fail because the descrambling codes do not match the transmitted scrambling codes.

At frame $f_{n+2}$, the UE may again perform the four decoding passes, starting with applying the first descrambling code (e.g., ++) to PDCCH 305-c. At decoding pass 310-c, the UE may soft combine PDCCH 305-c using descrambling code −+ with previous PDCCH 305-b descrambled with +−, and PDCCH 305-a descrambled with ++. If decoding pass 310-c passes, the UE may perform further operations according to the decoded DCI as described above. If decoding pass 310-c fails (e.g., because the soft-combined symbols from PDCCH 305-a, 305-b, and 305-c still do not overcome the channel conditions), the UE may perform additional decoding passes at frame $f_{n+2}$, which may also fail because the descrambling codes do not match the transmitted scrambling codes.

At frame $f_{n+2}$, the UE may again perform the four decoding passes, starting with applying the first descrambling code (e.g., ++) to PDCCH 305-d. At decoding pass 310-d, the UE may soft combine PDCCH 305-d using descrambling code −− with previous PDCCH 305-c descrambled with −+, previous PDCCH 305-b descrambled with +−, and PDCCH 305-a descrambled with ++. If decoding pass 310-d passes, the UE may perform further operations according to the decoded DCI as described above. Thus, the UE may have four decoding passes 310-a, 310-b, 310-c, and 310-d in which decoding of the transmitted PDCCH may be successful. Because the UE may indicate a successful decode of the PDCCH via an ACK of PDSCH (assuming decoding of PDSCH passes) or by transmitted PUSCH, the base station may contingently transmit PDCCHs 305-b, 305-c, and 305-d. Thus, the contingently repeated PDCCHs provide additional signal energy that can be soft-combined by the UE to successfully decode PDCCH transmissions when needed, but allowing the base station to efficiently use resources where a first PDCCH repetition is decoded successfully. Thus, the described PDCCH repetition techniques adapt the resource usage and effective code rate to the channel conditions, providing additional redundancy only when necessary.

Figure 4A:
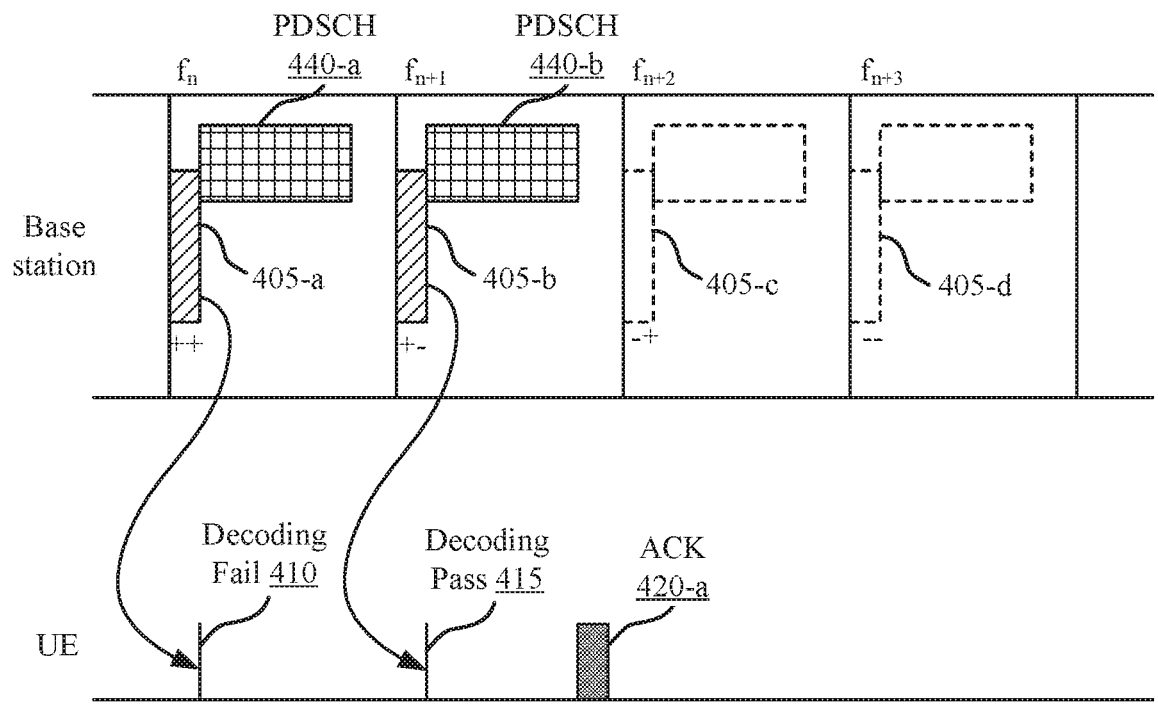
FIG. 4 illustrates an example of a frame structure that supports soft-combining of PDCCH for URLLC in accordance with aspects of the present disclosure.
Figure 4B:
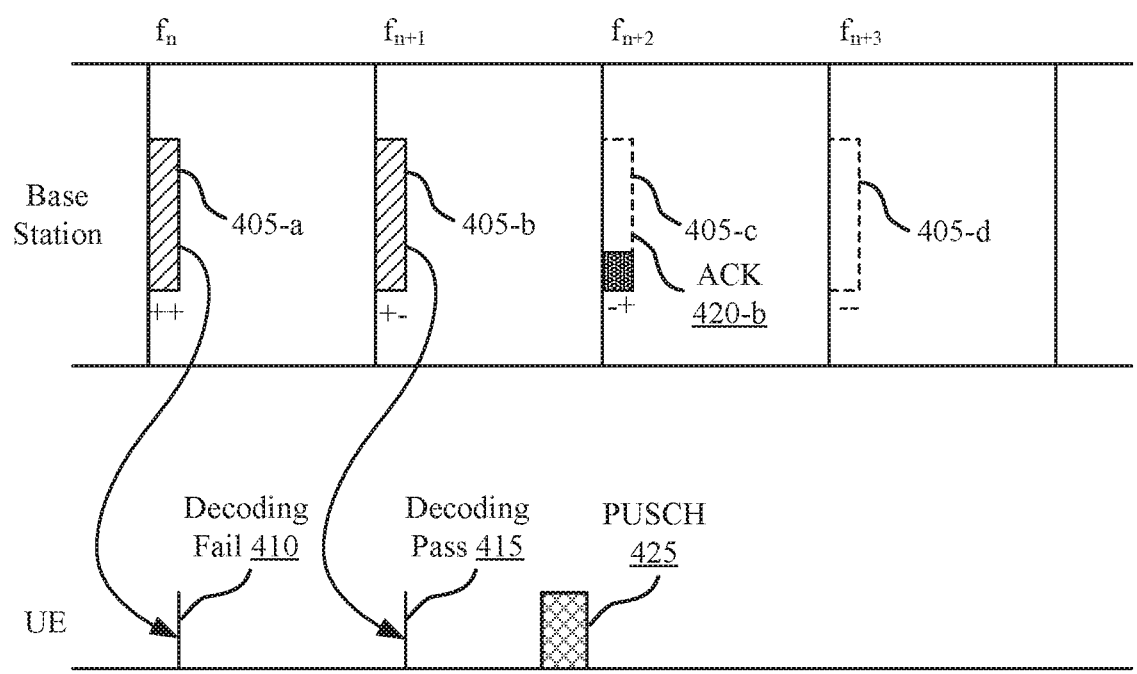

FIGS. 4A and 4B illustrate examples of communication processes 401 and 402 that support soft-combining of PDCCH for URLLC in accordance with various aspects of the present disclosure. In some examples, communication processes 401 and 402 may by implemented by aspects of wireless communication systems 100 and/or 200.

In some cases, a base station may identify a search space of a control channel (e.g., PDCCH) for a UE served by the base station for at least one downlink control transmission. Further, the base station may scramble a plurality of repetition versions of the at least one downlink control transmission according to a plurality of scrambling codes. As illustrated in the downlink grant process in FIG. 4A, in some cases, the base station may contingently transmit the plurality of scrambled repetition versions (e.g., PDCCH 405-a, PDCCH 405-b, etc.) of the at least one downlink control transmission in a plurality of TTIs. In some cases, the at least one downlink control transmission may be associated with a resource grant (uplink or downlink), and may comprise an indication of a modulation and coding scheme, resource block allocation, or both, to be used by a UE for uplink and/or downlink data transmissions pertaining to the resource grant.

In some cases, the UE may monitor a search space of a control channel for at least one downlink control transmission. Further, the UE may perform a plurality of decoding operations, as further described with reference to FIGS. 2 and 3, on a plurality of decoding candidates of the at least one downlink control transmission transmitted in a plurality of TTIs. For instance, at TTI $f_n$ the UE may perform a decoding operation on PDCCH 405-a, scrambled with ++. As depicted by decoding fail 410, the UE may not successful decode PDCCH 405-a (e.g., because of low channel conditions). The UE may perform additional decoding operations at TTI $f_n$ (not shown). In some cases, the UE may continue performing decoding operations at each TTI using hypotheses covering current and prior PDCCHs until it successfully obtains downlink control information. For example, at TTI $f_{n+1}$ the UE may perform a first decoding operation on PDCCH 405-b (which is scrambled with +− by the bases station), by applying descrambling code ++. Further, the UE may perform a second decoding operation on a combined decoding candidate that comprises soft-combined information from the first, current decoding candidate (PDCCH 405-b scrambled with +−) and a second, prior decoding candidate (PDCCH 405-*a* scrambled with ++) received in the prior TTI. The second decoding operation may comprise applying a second descrambling code (i.e., +−) to the first decoding candidate, and the first descrambling code (i.e., ++) to the second decoding candidate. In some cases, the UE may establish decoding pass 415 following the second decoding operation, and may perform operations according to the decoded DCI. For example, the DCI may be a downlink grant for PDSCH 440, which may be transmitted in each of TTIs $f_n$ and $f_{n+1}$. The UE may decode PDSCH 440 (e.g., by decoding PDSCH 440-*b* or by combining signal energy from PDSCH 440-*a* and 440-*b* where PDSCH 440-*a* has been buffered. If PDSCH 440 is successfully decoded, the UE may transmit ACK 420-*a*, indicating the same. In such cases, the base station may not need to continue transmitting repetition versions PDCCH 405-*c* and PDCCH 405-*b* of the at least one downlink control transmission. Instead, the base station may use these resources for additional transmissions (e.g., to the same or different UEs).

FIG. 4B illustrates an example of uplink transmission processes including reception of an uplink grant in at least one downlink control transmission using PDCCH repetition. As described above, the UE may establish decoding pass 415, after successfully decoding PDCCH 405-*b*, scrambled with +−. In some cases, the at least one downlink control transmission may comprise one or more uplink grants, as well as an indication of a resource block allocation fields, modulation and coding scheme, or both, for an uplink shared channel transmission (e.g., PUSCH). In some cases, the UE may identify a resource block allocation, and a modulation and coding scheme, for transmitting a PUSCH 425 based on the decoded DCI. In some cases, the resource block allocation and/or modulation and coding scheme selected by the UE may be based in part on a decoding index of the one or more uplink grants. Upon receiving uplink data in PUSCH 425, the base station may transmit ACK 420-*b*. Upon successfully decoding PUSCH 425, the base station may suppress transmission of repetition versions PDCCH 405-*c* and PDCCH 405-*b* of the at least one downlink control transmission. Instead, the base station may use these resources for additional transmissions (e.g., to the same or different UEs)

Figure 5A:
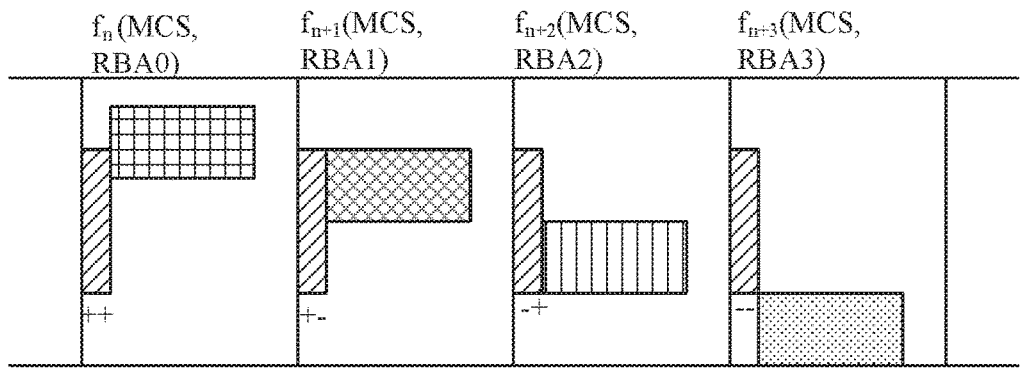
FIG. 5 illustrates an example of a frame structure that supports soft-combining of PDCCH for URLLC in accordance with aspects of the present disclosure.
Figure 5B:
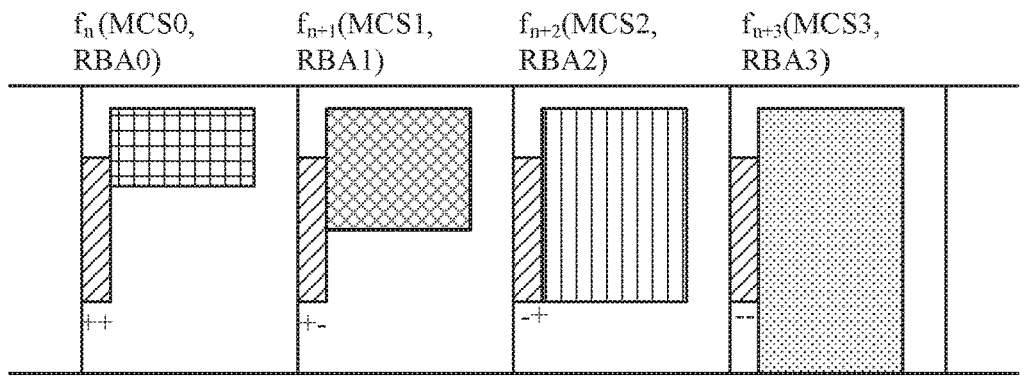

FIGS. 5A and 5B illustrate examples of a communication processes 501 and 502 that support soft-combining of PDCCH for URLLC in accordance with various aspects of the present disclosure. In some examples, communication process 500 may be implemented by aspects of wireless communication systems 100 and/or 200.

Communication process 501 illustrates the selection of a resource block allocation and modulation and coding scheme for a downlink shared channel transmission based on a decoding index of the one or more downlink grants. In some cases, a base station may identify a search space for PDCCH, for at least one downlink control transmission. Further, the base station may scramble a plurality of repetition versions of the at least one downlink control transmission (PDCCH 505-*a* scrambled using ++, +−, −+, and −−). In some cases, each of the downlink control transmission may comprise one or more downlink grants, indicating one or more downlink shared channel transmissions (e.g., PDSCH 510). In some cases, the at least one downlink control transmission comprises respective resource block allocation fields, modulation and coding schemes, or both, corresponding to each of the PDSCH transmissions. In some cases, the resource block allocation, and modulation and coding scheme selected by the UE, may be based in part on an decoding index of the downlink grant. For instance, if the UE decodes PDCCH 505-*a* in frame $f_{n+2}$, the UE may select a resource block allocation and modulation and coding scheme for receiving PDSCH 510-*c*, based on the decoding index of the downlink grant. In some cases, the same modulation and coding scheme, but variable resource block allocation may be applied for PDSCH in each transmission. For example, as illustrated in FIG. 5A, the resource block allocation varies between each of PDSCH 510-*a*, PDSCH 510-*b*, PDSCH 510-*c*, and PDSCH 510-*d*, whereas the modulation and coding scheme may remain constant (e.g., the number of allocated resource blocks may be the same). A UE may combine PDSCHs across TTIs according to each allocated PDSCH. Each PDSCH may be, for example, the same or a different redundancy version for a codeword that may be combined using incremental redundancy or chase combining.

Communication process 502 illustrates an example of variable modulation and coding schemes and resource block allocations, for reception of a downlink shared channel transmission. In some cases, the modulation and coding scheme, as well as resource block allocation may vary between transmissions. For example, as illustrated in FIG. 5B, the resource block allocation as well as the modulation and coding scheme may vary between each of PDSCH 510-*e*, PDSCH 510-*f*, PDSCH 510-*g*, and PDSCH 510-*h*. Furthermore, similar to the case of soft-combining PDCCH, the UE may decode the PDSCH by combining information for the PDSCH received in the plurality of TTIs (i.e., any combination of frames $f_n$–$f_{n+3}$). As shown in FIG. 5B, in some cases the modulation and coding scheme may include increasing redundancy in each successive PDSCH 510. This may be used, for example, to adapt the code rate to channel conditions to reduce BLER for PDSCH 510.

Figure 6:
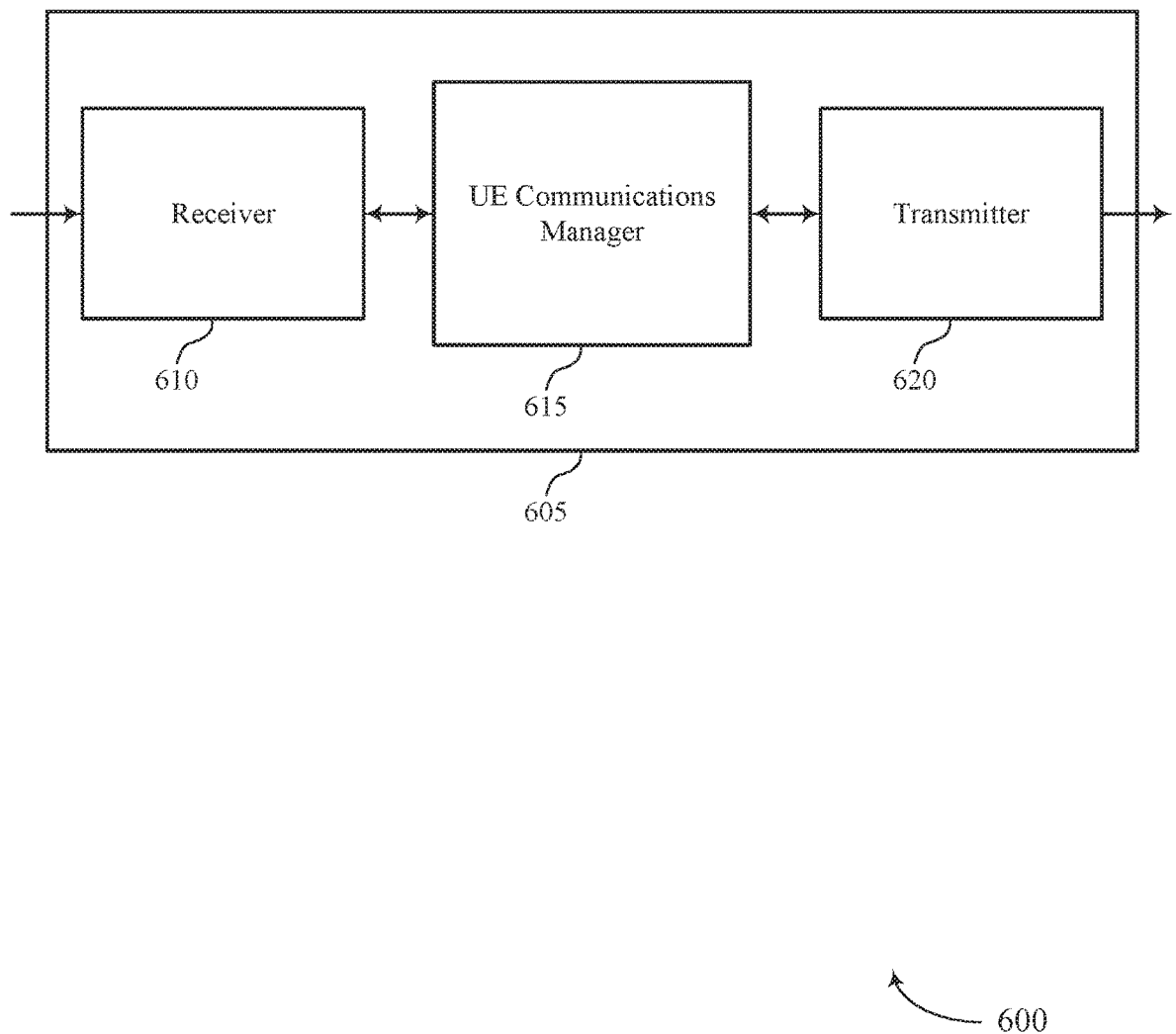
FIGS. 6 through 8 show block diagrams of a device that supports soft-combining of PDCCH for URLLC in accordance with aspects of the present disclosure.

FIG. 6 shows a block diagram 600 of a wireless device 605 that supports soft-combining of PDCCH for URLLC in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to soft-combining of PDCCH for URLLC, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may monitor a search space of a control channel for a downlink control information format, perform a set of decoding operations on a set of decoding candidates associated with the downlink control information format transmitted in a set of TTIs, where the set of decoding operations includes at least: performing a first decoding operation on a first decoding candidate received in a first TTI, the first decoding operation applying a first descrambling code to the first decoding candidate, perform a second decoding operation on a combined decoding candidate that includes soft-combined information from the first decoding candidate and a second decoding candidate received in a second, prior TTI, the second decoding operation applying a second descrambling code to the first decoding candidate and the first descrambling code to the second decoding candidate, and obtain downlink control information based on a result of the set of decoding operations.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
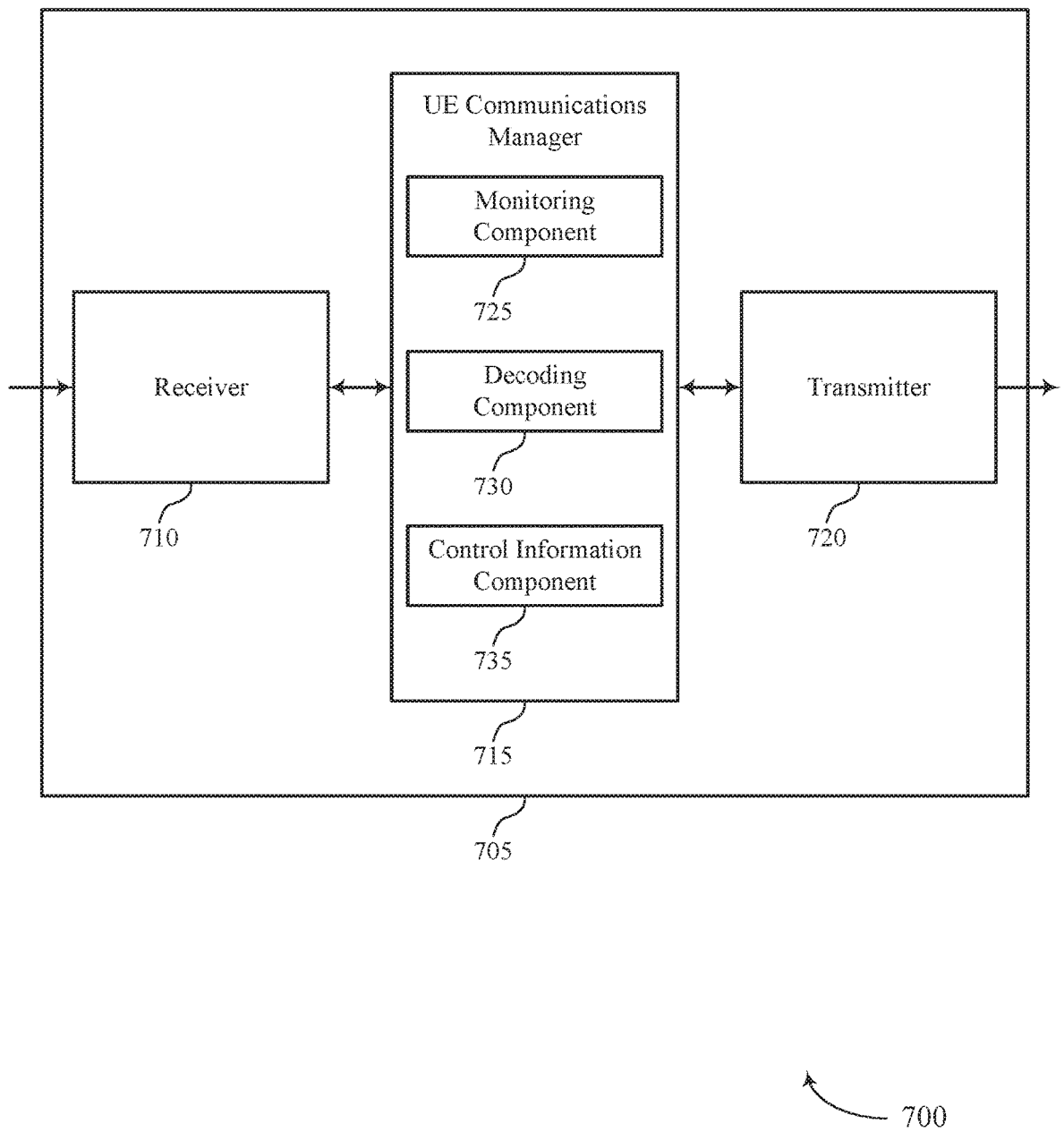

FIG. 7 shows a block diagram 700 of a wireless device 705 that supports soft-combining of PDCCH for URLLC in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to soft-combining of PDCCH for URLLC, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include monitoring component 725, decoding component 730, and control information component 735.

Monitoring component 725 may monitor a search space of a control channel for a downlink control information format.

Decoding component 730 may perform a set of decoding operations on a set of decoding candidates associated with the downlink control information format transmitted in a set of TTIs, where the set of decoding operations includes at least: performing a first decoding operation on a first decoding candidate received in a first TTI, the first decoding operation applying a first descrambling code to the first decoding candidate, perform a second decoding operation on a combined decoding candidate that includes soft-combined information from the first decoding candidate and a second decoding candidate received in a second, prior TTI, the second decoding operation applying a second descrambling code to the first decoding candidate and the first descrambling code to the second decoding candidate, and decode the downlink shared channel transmission by combining information for the downlink shared channel transmission received in the set of TTIs. In some cases, the downlink control information format is associated with a resource grant and includes a single modulation and coding scheme field and a single resource block allocation field. In some cases, the downlink control information format includes a set of downlink grants transmitted over the set of TTIs, and where each of the set of TTIs includes a downlink shared channel transmission corresponding to a respective one of the set of downlink grants. In some cases, the downlink control information format includes respective resource block allocation fields corresponding to each of the downlink shared channel transmissions. In some cases, the downlink control information format includes respective modulation and coding scheme fields corresponding to each of the downlink shared channel transmissions. In some cases, the downlink control information format includes a set of uplink grants transmitted over the set of TTIs.

Control information component 735 may obtain downlink control information based on a result of the set of decoding operations.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
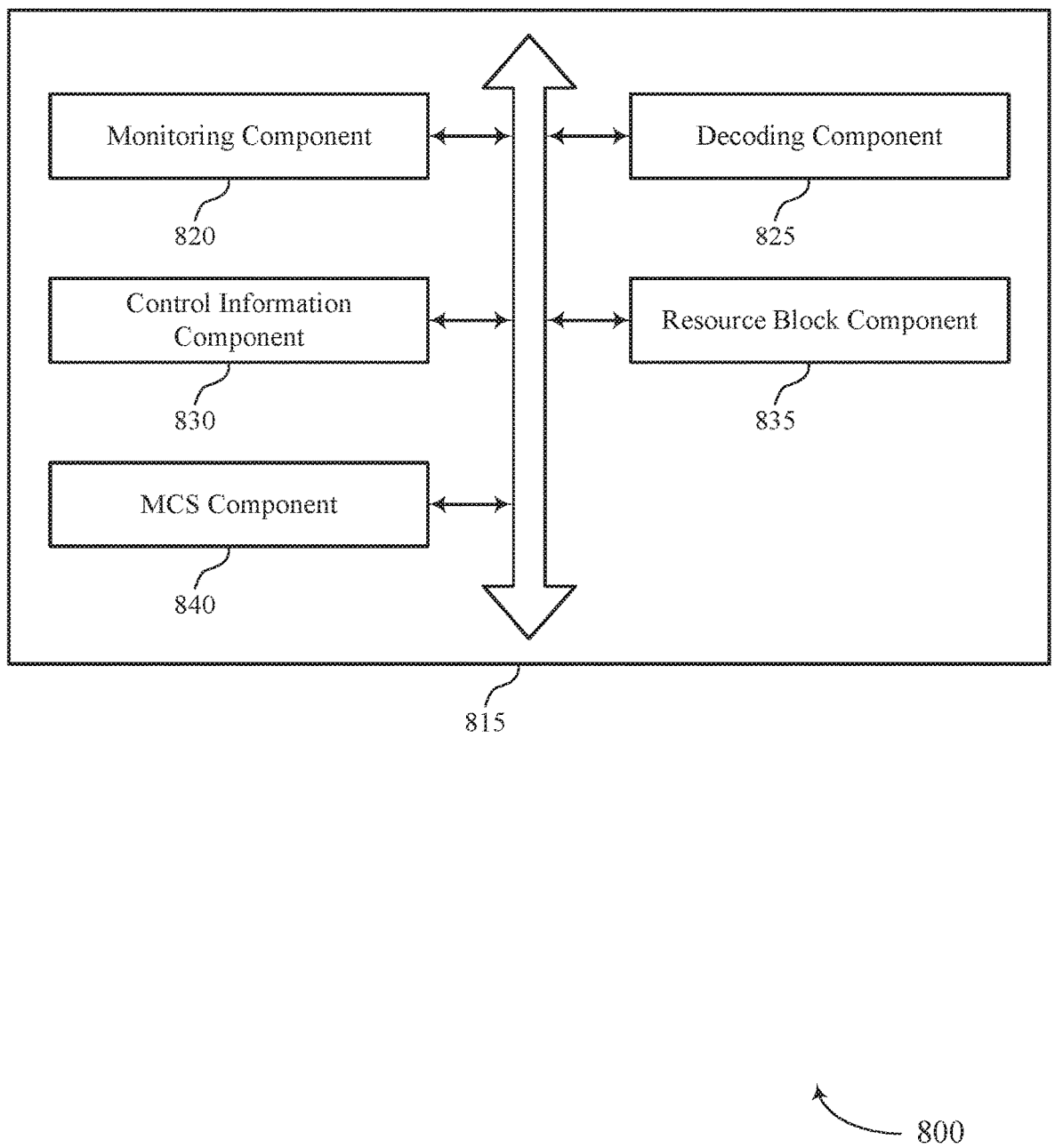

FIG. 8 shows a block diagram 800 of a UE communications manager 815 that supports soft-combining of PDCCH for URLLC in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include monitoring component 820, decoding component 825, control information component 830, resource block component 835, and MCS component 840. Each of these modules may communicate, directly or indirectly, with one another (e.g., via one or more buses).

Monitoring component 820 may monitor a search space of a control channel for a downlink control information format.

Decoding component 825 may perform a set of decoding operations on a set of decoding candidates associated with the downlink control information format transmitted in a set of TTIs, where the set of decoding operations includes at least: performing a first decoding operation on a first decoding candidate received in a first TTI, the first decoding operation applying a first descrambling code to the first decoding candidate, perform a second decoding operation on a combined decoding candidate that includes soft-combined information from the first decoding candidate and a second decoding candidate received in a second, prior TTI, the second decoding operation applying a second descrambling code to the first decoding candidate and the first descrambling code to the second decoding candidate, and decode the downlink shared channel transmission by combining information for the downlink shared channel transmission received in the set of TTIs. In some cases, the downlink control information format is associated with a resource grant and includes a single modulation and coding scheme field and a single resource block allocation field. In some cases, the downlink control information format includes a set of downlink grants transmitted over the set of TTIs, and where each of the set of TTIs includes a downlink shared channel transmission corresponding to a respective one of the set of downlink grants. In some cases, the downlink control information format includes respective resource block allocation fields corresponding to each of the downlink shared channel transmissions. In some cases, the downlink control information format includes respective modulation and coding scheme fields corresponding to each of the downlink shared channel transmissions. In some cases, the downlink control information format includes a set of uplink grants transmitted over the set of TTIs.

Control information component 830 may obtain downlink control information based on a result of the set of decoding operations.

In some cases, the downlink control information format includes a set of resource block allocation fields. Resource block component 835 may select a resource block allocation for an uplink shared channel transmission based on a decoding index of the set of uplink grants.

In some cases, the downlink control information format may include a set of modulation and coding scheme fields. MCS component 840 may select a modulation and coding scheme for an uplink shared channel transmission based on a decoding index of the set of uplink grants.

Figure 9:
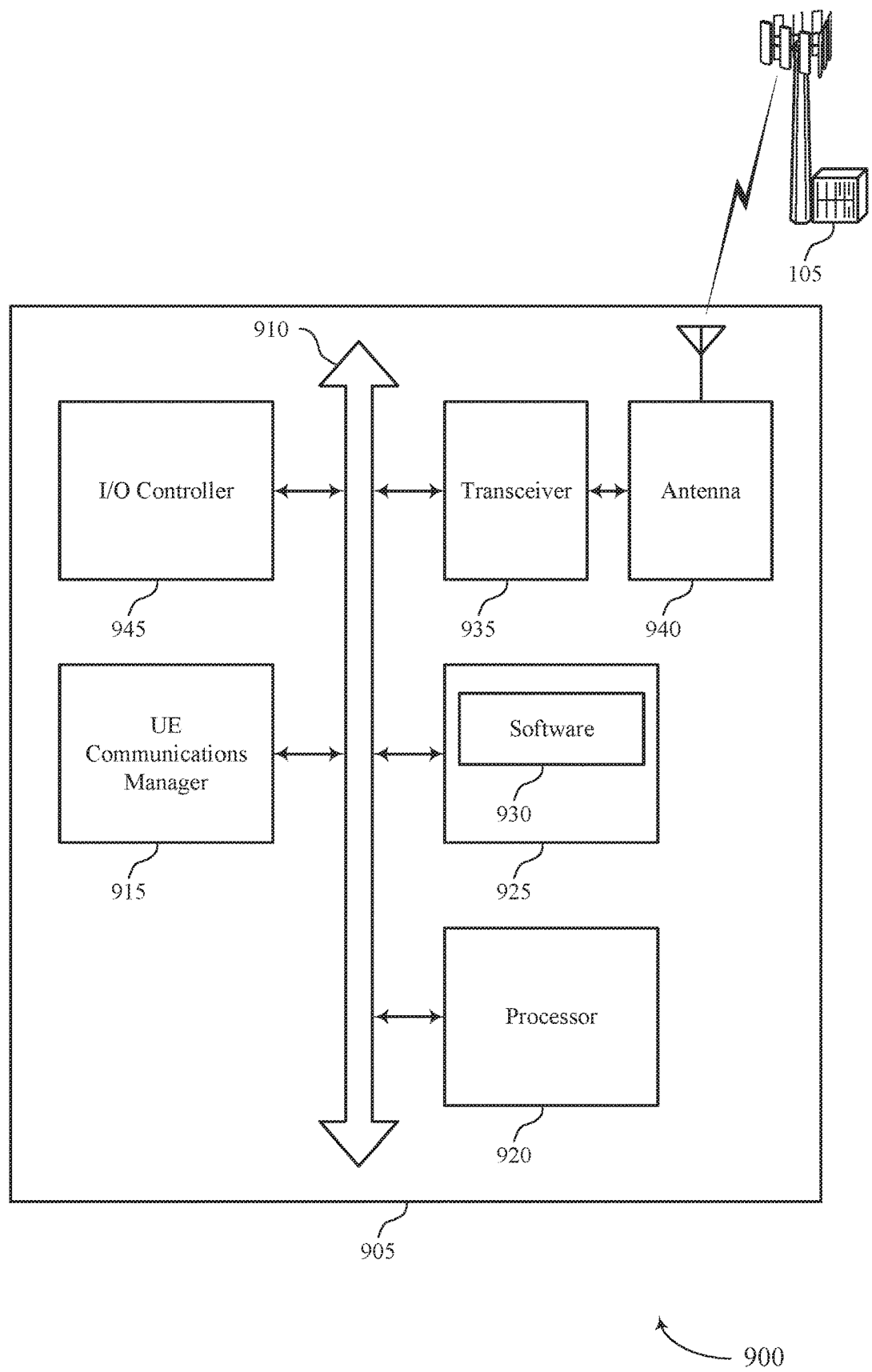
FIG. 9 illustrates a block diagram of a system including a UE that supports soft-combining of PDCCH for URLLC in accordance with aspects of the present disclosure.

FIG. 9 shows a diagram of a system 900 including a device 905 that supports soft-combining of PDCCH for URLLC in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting soft-combining of PDCCH for URLLC).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support soft-combining of PDCCH for URLLC. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
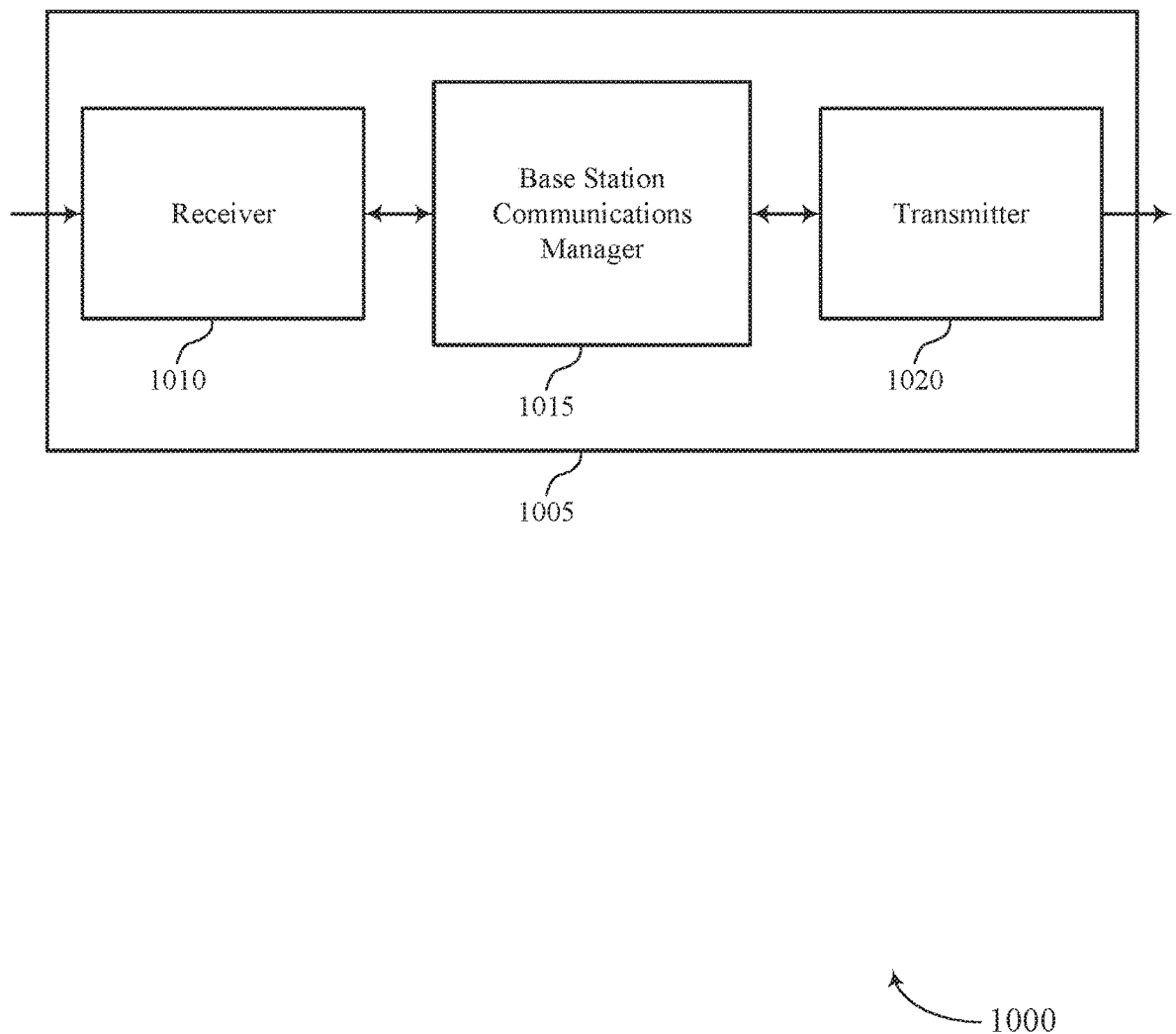
FIGS. 10 through 12 show block diagrams of a device that supports soft-combining of PDCCH for URLLC in accordance with aspects of the present disclosure.

FIG. 10 shows a block diagram 1000 of a wireless device 1005 that supports soft-combining of PDCCH for URLLC in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to soft-combining of PDCCH for URLLC, etc.). Information may be passed on to other components of the device. The receiver 1010 may be an example of aspects of the transceiver 1335 described with reference to FIG. 13. The receiver 1010 may utilize a single antenna or a set of antennas.

In some cases, the downlink control information format may include a set of resource block allocation fields. Receiver 1010 may monitor, for each of the first and second repetition versions of the downlink control information format, respective resource block allocations identified by a repetition version index to the set of resource block allocation fields and receive an uplink shared channel transmission on at least one of the respective resource block allocations. Furthermore, the downlink control information format may include a set of modulation and coding scheme fields, and receiver 1010 may monitor the respective resource block allocations according to respective modulation and coding schemes identified by the repetition version index to the set of modulation and coding scheme fields.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a search space of a control channel for a UE served by the base station for a downlink control information format, transmit a first repetition version of the downlink control information format in a first TTI, the first repetition version scrambled according to a first scrambling code, and transmit, based on determining that decoding of the first repetition version was unsuccessful at the UE, a second repetition version of the downlink control information format in a second TTI, the second repetition version scrambled according to a second scrambling code.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
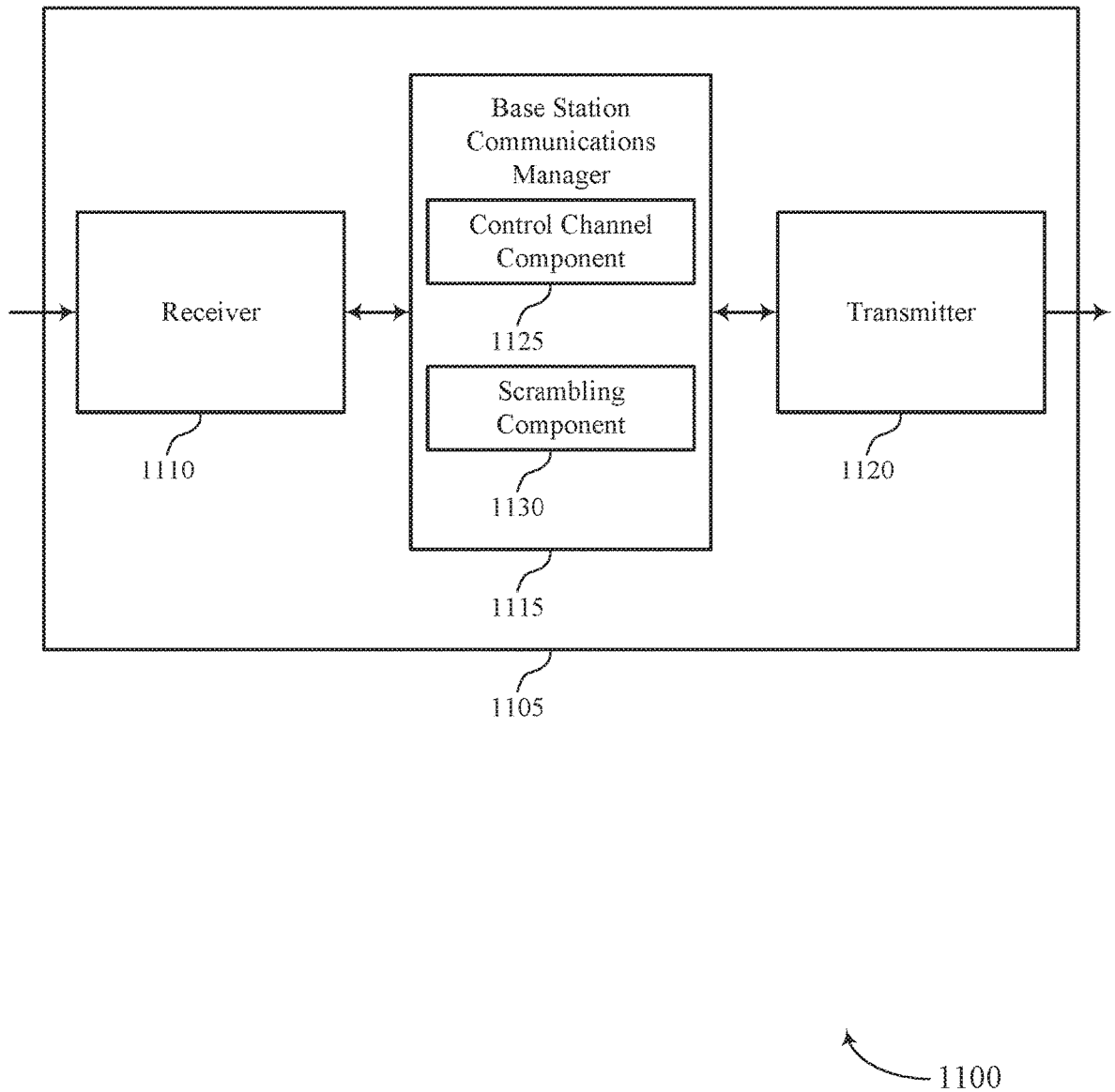

FIG. 11 shows a block diagram 1100 of a wireless device 1105 that supports soft-combining of PDCCH for URLLC in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to soft-combining of PDCCH for URLLC, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include control channel component 1125 and scrambling component 1130.

Control channel component 1125 may identify a search space of a control channel for a UE served by the base station for a downlink control information format. In some cases, the downlink control information format is associated with a resource grant and includes a single modulation and coding scheme field and a single resource block allocation field. In some cases, the downlink control information format includes a downlink grant, and control channel component 1125 may transmit a first repetition of a downlink shared channel transmission in the first TTI, and transmit a second repetition of the downlink shared channel transmission in the second TTI.

Scrambling component 1130 may transmit a first repetition version of the downlink control information format in a first TTI, the first repetition version scrambled according to a first scrambling code and transmit, based on determining that decoding of the first repetition version was unsuccessful at the UE, a second repetition version of the downlink control information format in a second TTI, the second repetition version scrambled according to a second scrambling code.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
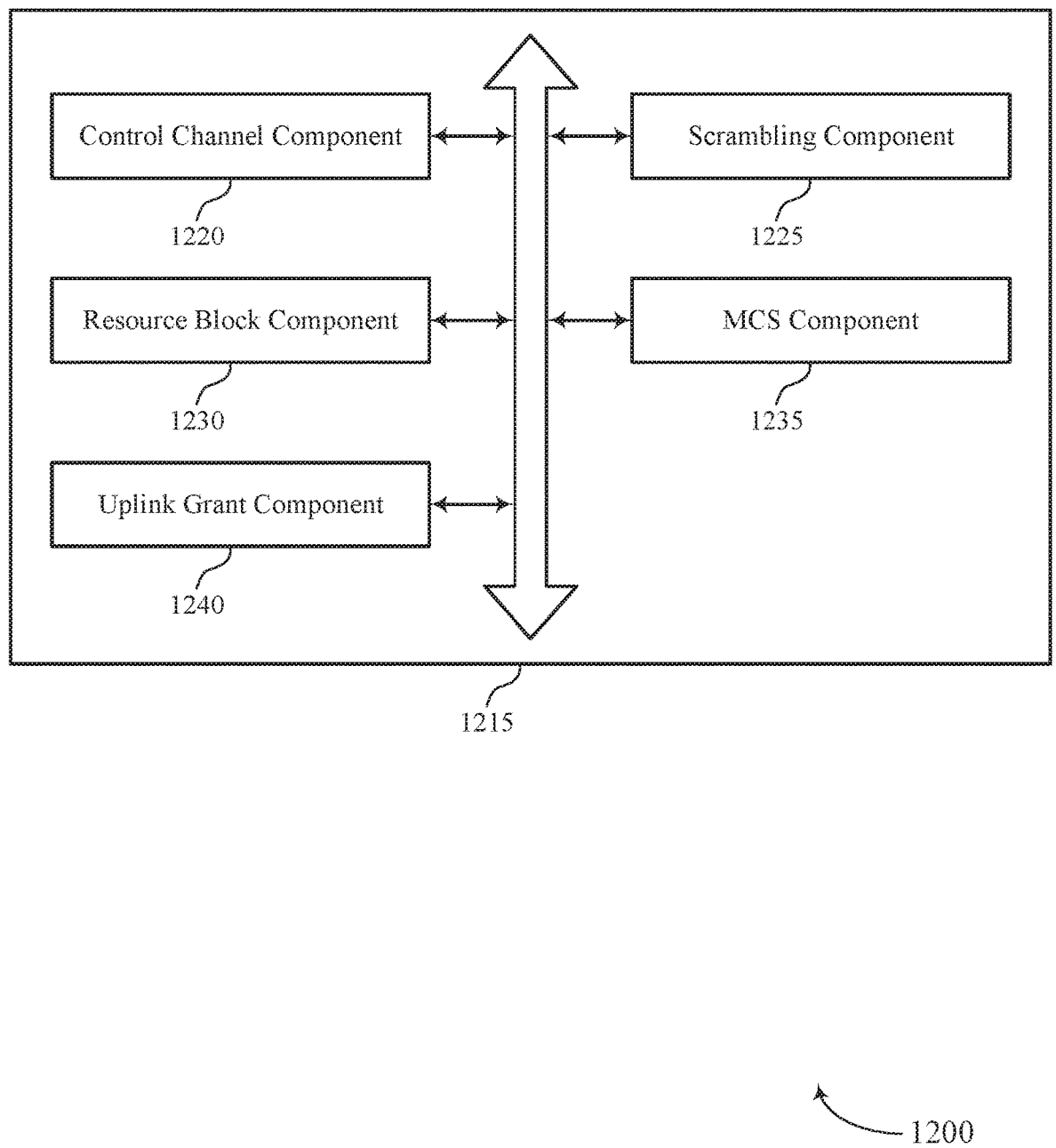

FIG. 12 shows a block diagram 1200 of a base station communications manager 1215 that supports soft-combining of PDCCH for URLLC in accordance with aspects of the present disclosure. The base station communications manager 1215 may be an example of aspects of a base station communications manager 1315 described with reference to FIGS. 10, 11, and 13. The base station communications manager 1215 may include control channel component 1220, scrambling component 1225, resource block component 1230, MCS component 1235, and uplink grant component 1240. Each of these modules may communicate, directly or indirectly, with one another (e.g., via one or more buses).

Control channel component 1220 may identify a search space of a control channel for a UE served by the base station for a downlink control information format. In some cases, the downlink control information format is associated with a resource grant and includes a single modulation and coding scheme field and a single resource block allocation field. In some cases, the downlink control information format includes a downlink grant, and control channel component 1220 may transmit a first repetition of a downlink shared channel transmission in the first TTI, and transmit a second repetition of the downlink shared channel transmission in the second TTI.

Scrambling component 1225 may transmit a first repetition version of the downlink control information format in a first TTI, the first repetition version scrambled according to a first scrambling code and transmit, based on determining that decoding of the first repetition version was unsuccessful at the UE, a second repetition version of the downlink control information format in a second TTI, the second repetition version scrambled according to a second scrambling code.

In some cases, the downlink control information format includes respective resource block allocation fields corresponding to each of a set of repetition versions of the downlink shared channel transmission. Resource block component 1230 may identify a set of resource blocks for transmitting each of the downlink shared channel transmissions.

In some cases, the downlink control information format includes respective modulation and coding scheme fields corresponding to each of a set of repetition versions of the downlink shared channel transmission. MCS component 1235 may identify a modulation and coding scheme for each of the downlink shared channel transmissions.

In some cases, the downlink control information format includes an uplink grant. Uplink grant component 1240 may generate a set of uplink grants for each of the uplink shared channel transmissions.

Figure 13:
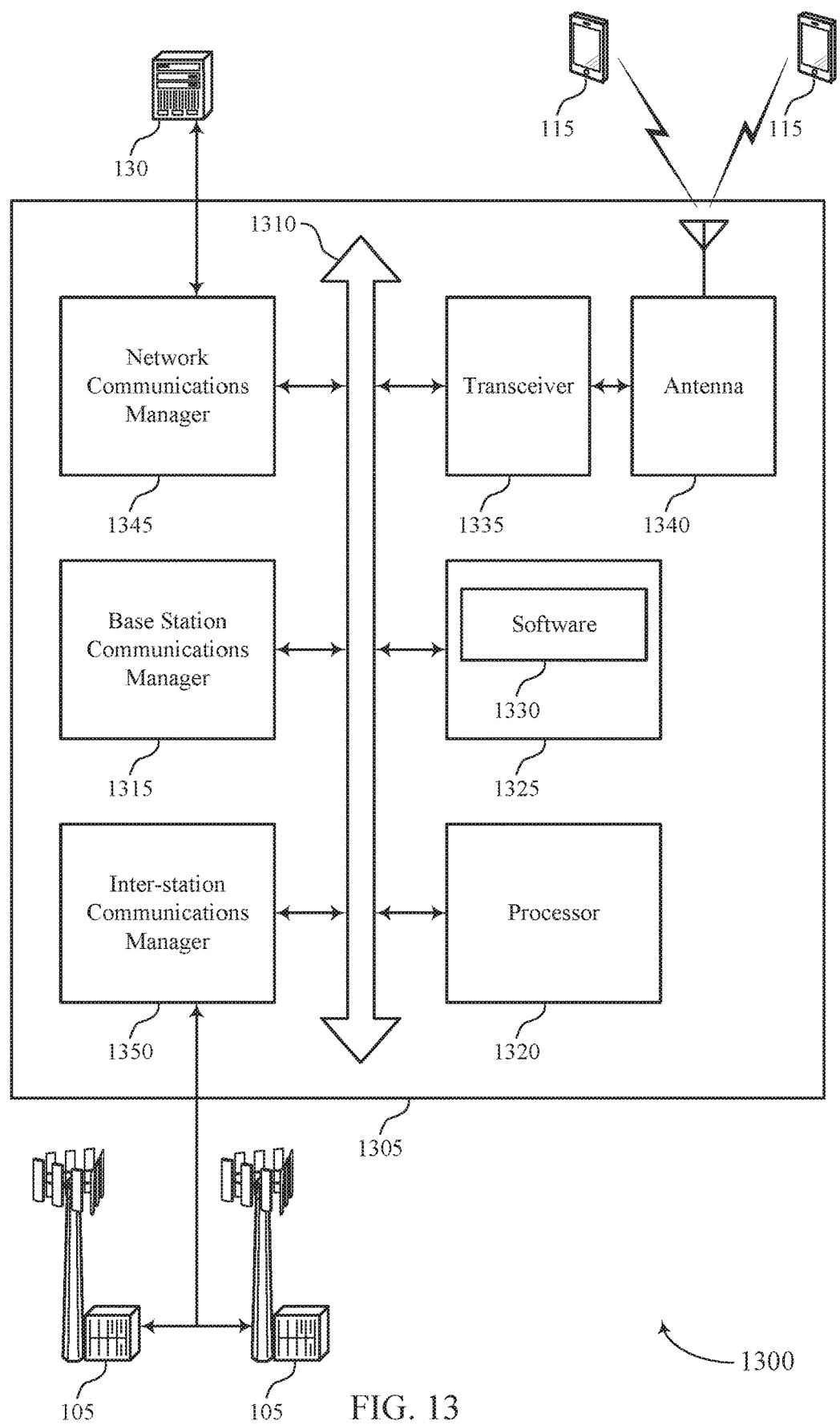
FIG. 13 illustrates a block diagram of a system including a base station that supports soft-combining of PDCCH for URLLC in accordance with aspects of the present disclosure.

FIG. 13 shows a diagram of a system 1300 including a device 1305 that supports soft-combining of PDCCH for URLLC in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting soft-combining of PDCCH for URLLC).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support soft-combining of PDCCH for URLLC. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
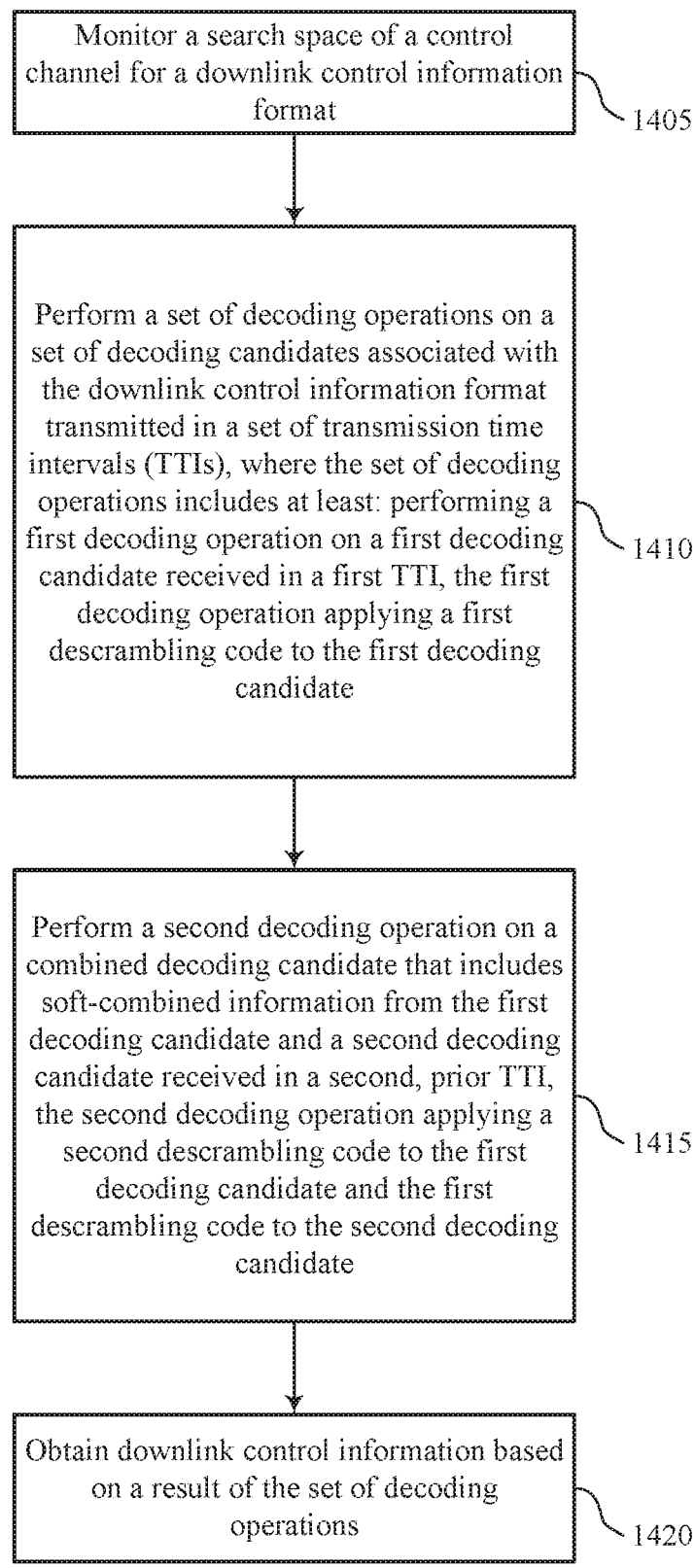
FIGS. 14 through 15 illustrate methods for soft-combining of PDCCH for URLLC in accordance with aspects of the present disclosure.

FIG. 14 shows a flowchart illustrating a method 1400 for soft-combining of PDCCH for URLLC in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may monitor a search space of a control channel for a downlink control information format. The operations of 1405 may be performed according to the methods described herein. In certain examples, aspects of the operations of 1405 may be performed by a monitoring component as described with reference to FIGS. 6 through 9.

At 1410, the UE 115 may perform a plurality of decoding operations on a plurality of decoding candidates associated with the downlink control information format transmitted in a plurality of TTIs, wherein the plurality of decoding operations comprises at least: performing a first decoding operation on a first decoding candidate received in a first TTI, the first decoding operation applying a first descrambling code to the first decoding candidate. The operations of 1410 may be performed according to the methods described herein. In certain examples, aspects of the operations of 1410 may be performed by a decoding component as described with reference to FIGS. 6 through 9.

At 1415, the UE 115 may perform a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate. The operations of 1415 may be performed according to the methods described herein. In certain examples, aspects of the operations of 1415 may be performed by a decoding component as described with reference to FIGS. 6 through 9.

At 1420, the UE 115 may obtain downlink control information based at least in part on a result of the plurality of decoding operations. The operations of 1420 may be performed according to the methods described herein. In certain examples, aspects of the operations of 1420 may be performed by a control information component as described with reference to FIGS. 6 through 9.

Figure 15:
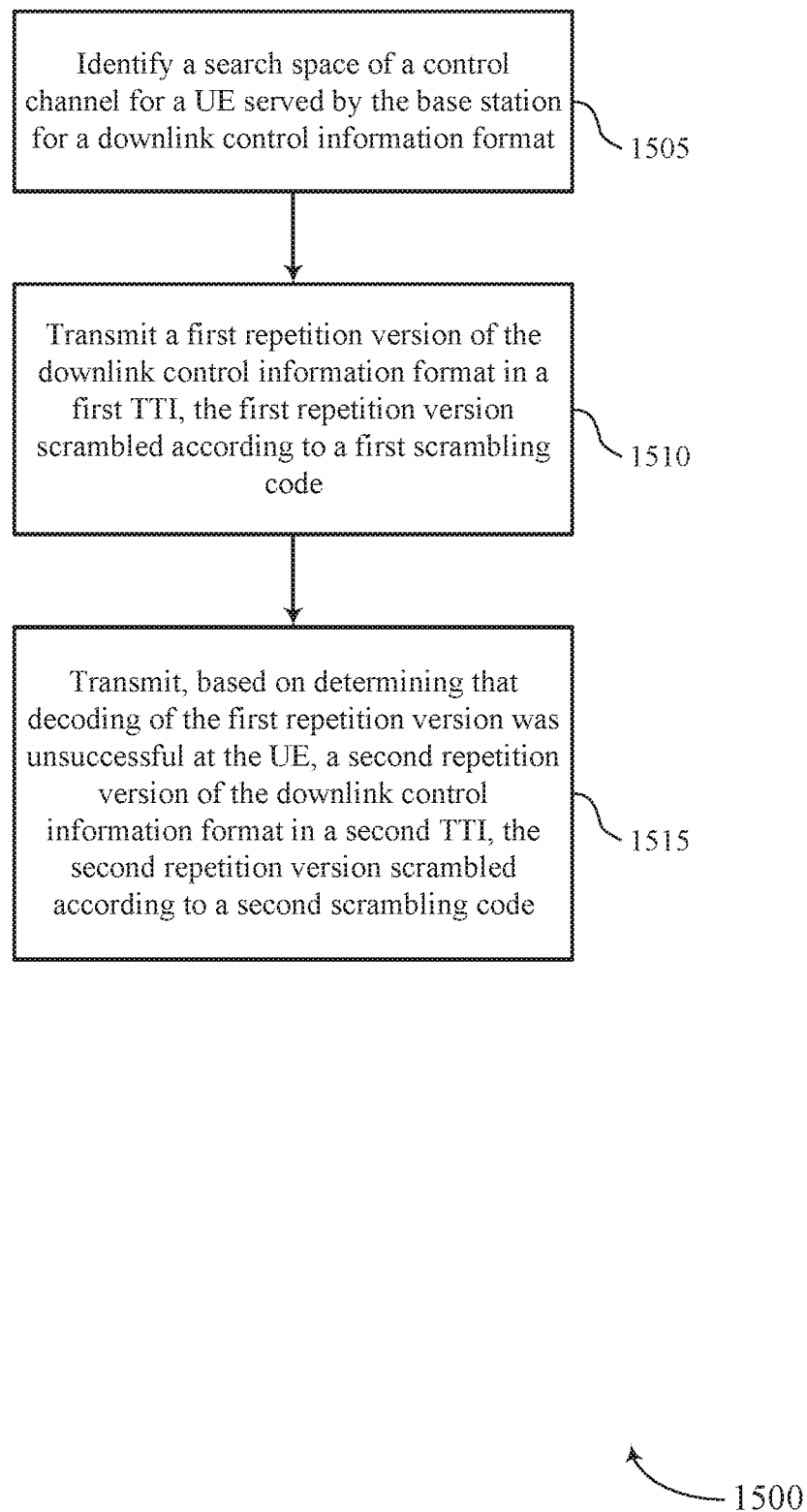

FIG. 15 shows a flowchart illustrating a method 1500 for soft-combining of PDCCH for URLLC in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1505, the base station 105 may identify a search space of a control channel for a UE served by the base station for a downlink control information format. The operations of 1505 may be performed according to the methods described herein. In certain examples, aspects of the operations of 1505 may be performed by a control channel component as described with reference to FIGS. 10 through 13.

At 1510, the base station 105 may transmit a first repetition version of the downlink control information format in a first TTI, the first repetition version scrambled according to a first scrambling code. The operations of 1510 may be performed according to the methods described herein. In certain examples, aspects of the operations of 1510 may be performed by a scrambling component as described with reference to FIGS. 10 through 13.

At 1515, the base station 105 may transmit, based on determining that decoding of the first repetition version was unsuccessful at the UE, a second repetition version of the downlink control information format in a second TTI, the second repetition version scrambled according to a second scrambling code. The operations of 1515 may be performed according to the methods described herein. In certain examples, aspects of the operations of 1515 may be performed by a scrambling component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring a search space of a control channel for a downlink control information format;
    performing a plurality of decoding operations on a plurality of decoding candidates associated with the downlink control information format transmitted in a plurality of transmission time intervals (TTIs), wherein the plurality of decoding operations comprises at least:
        performing a first decoding operation on a first decoding candidate received in a first TTI, the first decoding operation applying a first descrambling code to the first decoding candidate; and
        performing a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate; and
    obtaining downlink control information based at least in part on a result of the plurality of decoding operations.

2. The method of claim 1, wherein the downlink control information format is associated with a resource grant and comprises a single modulation and coding scheme field and a single resource block allocation field.

3. The method of claim 1, wherein the downlink control information format comprises a plurality of downlink grants transmitted over the plurality of TTIs, and wherein each of the plurality of TTIs comprises a downlink shared channel transmission corresponding to a respective one of the plurality of downlink grants.

4. The method of claim 3, wherein the downlink control information format comprises respective resource block allocation fields corresponding to each of the downlink shared channel transmissions.

5. The method of claim 3, wherein the downlink control information format comprises respective modulation and coding scheme fields corresponding to each of the downlink shared channel transmissions.

6. The method of claim 3, further comprising:
decoding the downlink shared channel transmission by combining information for the downlink shared channel transmission received in the plurality of TTIs.

7. The method of claim 1, wherein the downlink control information format comprises a plurality of uplink grants transmitted over the plurality of TTIs.

8. The method of claim 7, wherein the downlink control information format comprises a plurality of resource block allocation fields, the method further comprising:
selecting a resource block allocation for an uplink shared channel transmission based on a decoding index of the plurality of uplink grants.

9. The method of claim 7, wherein the downlink control information format comprises a plurality of modulation and coding scheme fields, the method further comprising:
selecting a modulation and coding scheme for an uplink shared channel transmission based on a decoding index of the plurality of uplink grants.

10. A method for wireless communication, comprising:
identifying a search space of a control channel for a user equipment (UE) served by a network entity for a downlink control information format that comprises a plurality of resource block allocation fields;
transmitting a first repetition version of the downlink control information format in a first transmission time interval (TTI), the first repetition version scrambled according to a first scrambling code;
transmitting, based on determining that decoding of the first repetition version was unsuccessful at the UE, a second repetition version of the downlink control information format in a second TTI, the second repetition version scrambled according to a second scrambling code; and
communicating, for each of the first and second repetition versions of the downlink control information format, with the UE according to respective resource block allocations identified by a repetition version index to the plurality of resource block allocation fields.

11. The method of claim 10, wherein the downlink control information format is associated with a resource grant and comprises a single modulation and coding scheme field and a single resource block allocation field.

12. The method of claim 10, wherein the downlink control information format is associated with a downlink grant, further comprising:
transmitting a first repetition of a downlink shared channel transmission in the first TTI; and
transmitting a second repetition of the downlink shared channel transmission in the second TTI.

13. The method of claim 12, wherein the downlink control information format comprises the resource block allocation fields corresponding to each of a plurality of repetition versions of the downlink shared channel transmission.

14. The method of claim 12, wherein the downlink control information format comprises respective modulation and coding scheme fields corresponding to each of a plurality of repetition versions of the downlink shared channel transmission.

15. The method of claim 10, wherein the downlink control information format is associated with an uplink grant.

16. The method of claim 15, wherein the communicating further comprises:
monitoring, for each of the first and second repetition versions of the downlink control information format, the respective resource block allocations identified by the repetition version index to the plurality of resource block allocation fields; and
receiving an uplink shared channel transmission on at least one of the respective resource block allocations.

17. The method of claim 16, wherein the downlink control information format comprises a plurality of modulation and coding scheme fields, and wherein the monitoring comprises:
monitoring the respective resource block allocations according to respective modulation and coding schemes identified by the repetition version index to the plurality of modulation and coding scheme fields.

18. An apparatus for wireless communication, comprising:
means for monitoring a search space of a control channel for a downlink control information format;
means for performing a plurality of decoding operations on a plurality of decoding candidates associated with the downlink control information format transmitted in a plurality of transmission time intervals (TTIs), wherein the plurality of decoding operations comprises at least:
means for performing a first decoding operation on a first decoding candidate received in a first TTI, the first decoding operation applying a first descrambling code to the first decoding candidate; and
means for performing a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate; and
means for obtaining downlink control information based at least in part on a result of the plurality of decoding operations.

19. The apparatus of claim 18, wherein the downlink control information format is associated with a resource grant and comprises a single modulation and coding scheme field and a single resource block allocation field.

20. The apparatus of claim 18, wherein the downlink control information format comprises a plurality of downlink grants transmitted over the plurality of TTIs, and wherein each of the plurality of TTIs comprises a downlink shared channel transmission corresponding to a respective one of the plurality of downlink grants.

21. The apparatus of claim 20, wherein the downlink control information format comprises respective resource block allocation fields corresponding to each of the downlink shared channel transmissions.

22. The apparatus of claim 20, wherein the downlink control information format comprises respective modulation and coding scheme fields corresponding to each of the downlink shared channel transmissions.

23. The apparatus of claim 20, further comprising:
means for decoding the downlink shared channel transmission by combining information for the downlink shared channel transmission received in the plurality of TTIs.

24. The apparatus of claim 18, wherein the downlink control information format comprises a plurality of uplink grants transmitted over the plurality of TTIs.

25. The apparatus of claim 24, wherein the downlink control information format comprises a plurality of resource block allocation fields, further comprising:
means for selecting a resource block allocation for an uplink shared channel transmission based on a decoding index of the plurality of uplink grants.

26. The apparatus of claim 24, wherein the downlink control information format comprises a plurality of modulation and coding scheme fields, further comprising:
means for selecting a modulation and coding scheme for an uplink shared channel transmission based on a decoding index of the plurality of uplink grants.

27. An apparatus for wireless communication, comprising:
means for identifying a search space of a control channel for a user equipment (UE) served by a network entity for a downlink control information format that comprises a plurality of resource block allocation fields;
means for transmitting a first repetition version of the downlink control information format in a first transmission time interval (TTI), the first repetition version scrambled according to a first scrambling code;
means for transmitting, based on determining that decoding of the first repetition version was unsuccessful at the UE, a second repetition version of the downlink control information format in a second TTI, the second repetition version scrambled according to a second scrambling code; and
means for communicating, for each of the first and second repetition versions of the downlink control information format, with the UE according to respective resource block allocations identified by a repetition version index to the plurality of resource block allocation fields.

28. The apparatus of claim 27, wherein the downlink control information format is associated with a resource grant and comprises a single modulation and coding scheme field and a single resource block allocation field.

29. The apparatus of claim 27, wherein the downlink control information format is associated with a downlink grant, and wherein the transmitting further comprises:
means for transmitting a first repetition of a downlink shared channel transmission in the first TTI; and
means for transmitting a second repetition of the downlink shared channel transmission in the second TTI.

30. The apparatus of claim 29, wherein the downlink control information format comprises the resource block allocation fields corresponding to each of a plurality of repetition versions of the downlink shared channel transmission.

31. The apparatus of claim 29, wherein the downlink control information format comprises respective modulation and coding scheme fields corresponding to each of a plurality of repetition versions of the downlink shared channel transmission.

32. The apparatus of claim 27, wherein the downlink control information format is associated with an uplink grant.

33. The apparatus of claim 32, wherein the means for communicating comprises:
means for monitoring, for each of the first and second repetition versions of the downlink control information format, the respective resource block allocations identified by the repetition version index to the plurality of resource block allocation fields; and
means for receiving an uplink shared channel transmission on at least one of the respective resource block allocations.

34. The apparatus of claim 33, wherein the downlink control information format comprises a plurality of modulation and coding scheme fields, and wherein the means for communicating comprises:
means for monitoring the respective resource block allocations according to respective modulation and coding schemes identified by the repetition version index to the plurality of modulation and coding scheme fields.

35. An apparatus for wireless communication, comprising:
a processor;
a memory coupled with the processor, wherein the memory comprises instructions executable by the processor to cause the apparatus to:
monitor a search space of a control channel for a downlink control information format;
perform a plurality of decoding operations on a plurality of decoding candidates associated with the downlink control information format transmitted in a plurality of transmission time intervals (TTIs), wherein the plurality of decoding operations comprises at least:
performing a first decoding operation on a first decoding candidate received in a first TTI, the first decoding operation applying a first descrambling code to the first decoding candidate; and
performing a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate; and
obtain downlink control information based at least in part on a result of the plurality of decoding operations.

36. The apparatus of claim 35, wherein the downlink control information format is associated with a resource grant and comprises a single modulation and coding scheme field and a single resource block allocation field.

37. The apparatus of claim 35, wherein the downlink control information format comprises a plurality of downlink grants transmitted over the plurality of TTIs, and wherein each of the plurality of TTIs comprises a downlink shared channel transmission corresponding to a respective one of the plurality of downlink grants.

38. The apparatus of claim 37, wherein the downlink control information format comprises respective resource block allocation fields corresponding to each of the downlink shared channel transmissions.

39. The apparatus of claim 37, wherein the downlink control information format comprises respective modulation and coding scheme fields corresponding to each of the downlink shared channel transmissions.

40. The apparatus of claim 37, wherein the instructions are further executable by the processor to cause the apparatus to:
decode the downlink shared channel transmission by combining information for the downlink shared channel transmission received in the plurality of TTIs.

41. The apparatus of claim 35, wherein the downlink control information format comprises a plurality of uplink grants transmitted over the plurality of TTIs.

42. The apparatus of claim 41, wherein the downlink control information format comprises a plurality of resource block allocation fields, and wherein the instructions are further executable by the processor to cause the apparatus to:
select a resource block allocation for an uplink shared channel transmission based on a decoding index of the plurality of uplink grants.

43. The apparatus of claim 41, wherein the downlink control information format comprises a plurality of modulation and coding scheme fields, and wherein the instructions are further executable by the processor to cause the apparatus to:
select a modulation and coding scheme for an uplink shared channel transmission based on a decoding index of the plurality of uplink grants.

44. An apparatus for wireless communication, comprising:
a processor;
a memory coupled with the processor, wherein the memory comprises instructions executable by the processor to cause the apparatus to:
identify a search space of a control channel for a user equipment (UE) served by a network entity for a downlink control information format that comprises a plurality of resource block allocation fields;
transmit a first repetition version of the downlink control information format in a first transmission time interval (TTI), the first repetition version scrambled according to a first scrambling code;
transmit, based on determining that decoding of the first repetition version was unsuccessful at the UE, a second repetition version of the downlink control information format in a second TTI, the second repetition version scrambled according to a second scrambling code; and
communicate, for each of the first and second repetition versions of the downlink control information format, with the UE according to respective resource block allocations identified by a repetition version index to the plurality of resource block allocation fields.

45. The apparatus of claim 44, wherein the downlink control information format is associated with a resource grant and comprises a single modulation and coding scheme field and a single resource block allocation field.

46. The apparatus of claim 44, wherein the downlink control information format is associated with a downlink grant, and wherein the instructions are further executable by the processor to cause the apparatus to:
transmit a first repetition of a downlink shared channel transmission in the first TTI; and
transmit a second repetition of the downlink shared channel transmission in the second TTI.

47. The apparatus of claim 46, wherein the downlink control information format comprises the resource block allocation fields corresponding to each of a plurality of repetition versions of the downlink shared channel transmission.

48. The apparatus of claim 46, wherein the downlink control information format comprises respective modulation and coding scheme fields corresponding to each of a plurality of repetition versions of the downlink shared channel transmission.

49. The apparatus of claim 44, wherein the downlink control information format is associated with an uplink grant.

50. The apparatus of claim 49, wherein the instructions are further executable by the processor to cause the apparatus to:
monitor, for each of the first and second repetition versions of the downlink control information format, the respective resource block allocations identified by the repetition version index to the plurality of resource block allocation fields; and
receive an uplink shared channel transmission on at least one of the respective resource block allocations.

51. The apparatus of claim 50, wherein the instructions are further executable by the processor to cause the apparatus to:
monitor the respective resource block allocations according to respective modulation and coding schemes identified by the repetition version index to the plurality of modulation and coding scheme fields.

52. A non-transitory computer-readable medium storing code for wireless communication, the code comprising instructions executable by a processor to:
monitor a search space of a control channel for a downlink control information format;
perform a plurality of decoding operations on a plurality of decoding candidates associated with the downlink control information format transmitted in a plurality of transmission time intervals (TTIs), wherein the plurality of decoding operations comprises at least:
performing a first decoding operation on a first decoding candidate received in a first TTI, the first decoding operation applying a first descrambling code to the first decoding candidate; and
performing a second decoding operation on a combined decoding candidate that comprises soft-combined information from the first decoding candidate and a second decoding candidate received in a second, prior TTI, the second decoding operation applying a second descrambling code to the first decoding candidate and the first descrambling code to the second decoding candidate; and
obtain downlink control information based at least in part on a result of the plurality of decoding operations.

53. The non-transitory computer-readable medium of claim 52, wherein the downlink control information format is associated with a resource grant and comprises a single modulation and coding scheme field and a single resource block allocation field.

54. The non-transitory computer-readable medium of claim 52, wherein the downlink control information format comprises a plurality of downlink grants transmitted over the plurality of TTIs, and wherein each of the plurality of TTIs comprises a downlink shared channel transmission corresponding to a respective one of the plurality of downlink grants.

55. The non-transitory computer-readable medium of claim 54, wherein the downlink control information format comprises respective resource block allocation fields corresponding to each of the downlink shared channel transmissions.

56. The non-transitory computer-readable medium of claim 54, wherein the downlink control information format comprises respective modulation and coding scheme fields corresponding to each of the downlink shared channel transmissions.

57. The non-transitory computer-readable medium of claim 54, wherein the instructions are further executable by the processor to:
decode the downlink shared channel transmission by combining information for the downlink shared channel transmission received in the plurality of TTIs.

58. The non-transitory computer-readable medium of claim 52, wherein the downlink control information format comprises a plurality of uplink grants transmitted over the plurality of TTIs.

59. The non-transitory computer-readable medium of claim 58, wherein the downlink control information format comprises a plurality of resource block allocation fields, and wherein the instructions are further executable by the processor to:
select a resource block allocation for an uplink shared channel transmission based on a decoding index of the plurality of uplink grants.

60. The non-transitory computer-readable medium of claim 58, wherein the downlink control information format comprises a plurality of modulation and coding scheme fields, wherein the instructions are further executable by the processor to:
select a modulation and coding scheme for an uplink shared channel transmission based on a decoding index of the plurality of uplink grants.

61. A non-transitory computer-readable medium storing code for wireless communication, the code comprising instructions executable by a processor to:
identify a search space of a control channel for a user equipment (UE) served by a network entity for a downlink control information format that comprises a plurality of resource block allocation fields;
transmit a first repetition version of the downlink control information format in a first transmission time interval (TTI), the first repetition version scrambled according to a first scrambling code;
transmit, based on determining that decoding of the first repetition version was unsuccessful at the UE, a second repetition version of the downlink control information format in a second TTI, the second repetition version scrambled according to a second scrambling code; and
communicate, for each of the first and second repetition versions of the downlink control information format, with the UE according to respective resource block allocations identified by a repetition version index to the plurality of resource block allocation fields.

62. The non-transitory computer-readable medium of claim 61, wherein the downlink control information format is associated with a resource grant and comprises a single modulation and coding scheme field and a single resource block allocation field.

63. The non-transitory computer-readable medium of claim 61, wherein the downlink control information format is associated with a downlink grant, and wherein the instructions are further executable by the processor to:
transmit a first repetition of a downlink shared channel transmission in the first TTI; and
transmit a second repetition of the downlink shared channel transmission in the second TTI.

64. The non-transitory computer-readable medium of claim 63, wherein the downlink control information format comprises the resource block allocation fields corresponding to each of a plurality of repetition versions of the downlink shared channel transmission.

65. The non-transitory computer-readable medium of claim 63, wherein the downlink control information format comprises respective modulation and coding scheme fields corresponding to each of a plurality of repetition versions of the downlink shared channel transmission.

66. The non-transitory computer-readable medium of claim 61, wherein the downlink control information format is associated with an uplink grant.

67. The non-transitory computer-readable medium of claim 66, wherein the instructions are further executable by the processor to:
monitor, for each of the first and second repetition versions of the downlink control information format, the respective resource block allocations identified by the repetition version index to the plurality of resource block allocation fields; and
receive an uplink shared channel transmission on at least one of the respective resource block allocations.

68. The non-transitory computer-readable medium of claim 67, wherein the downlink control information format comprises a plurality of modulation and coding scheme fields, and wherein the instructions are further executable by the processor to:
monitor the respective resource block allocations according to respective modulation and coding schemes identified by the repetition version index to the plurality of modulation and coding scheme fields.

* * * * *